(12) United States Patent
Warne

(10) Patent No.: US 10,262,549 B2
(45) Date of Patent: Apr. 16, 2019

(54) VEHICLE SIMULATOR WITH A MOVING SYSTEM WITH TENSIONED ROPES

(71) Applicant: Ferrari S.p.A., Modena (IT)

(72) Inventor: Ashley Warne, Modena (IT)

(73) Assignee: Ferrari S.p.A., Modena (IT)

( * ) Notice: Subject to any disclaimer, the term of this patent is extended or adjusted under 35 U.S.C. 154(b) by 294 days.

(21) Appl. No.: 15/241,652

(22) Filed: Aug. 19, 2016

(65) Prior Publication Data

US 2017/0053548 A1 Feb. 23, 2017

(30) Foreign Application Priority Data

Aug. 21, 2015 (IT) .................. 102015000045842

(51) Int. Cl.
| | |
|---|---|
| *G09B 9/12* | (2006.01) |
| *G09B 9/04* | (2006.01) |
| *A63B 21/005* | (2006.01) |
| *G09B 19/16* | (2006.01) |
| *F16H 19/06* | (2006.01) |
| *A63B 21/00* | (2006.01) |

(52) U.S. Cl.
CPC ............ *G09B 9/12* (2013.01); *A63B 21/0058* (2013.01); *G09B 9/04* (2013.01); *G09B 19/167* (2013.01); *A63B 21/154* (2013.01); *F16H 19/06* (2013.01); *F16H 2019/069* (2013.01)

(58) Field of Classification Search
CPC .......... G09B 19/167; G09B 9/04; G09B 9/12; A63B 21/0058; A63B 21/154; F16H 19/06; F16H 2019/069
See application file for complete search history.

(56) References Cited

U.S. PATENT DOCUMENTS

| | | | | |
|---|---|---|---|---|
| 2,675,291 | A * | 4/1954 | Webster .................. | B66C 11/18 33/1 M |
| 3,529,481 | A * | 9/1970 | Budzyn .................. | B23Q 1/621 108/21 |
| 4,369,579 | A * | 1/1983 | Mizoule .................. | B43L 13/00 33/1 M |
| 4,601,663 | A * | 7/1986 | Allison .................... | G09B 9/46 434/33 |

(Continued)

FOREIGN PATENT DOCUMENTS

| | | |
|---|---|---|
| DE | 1497686 A1 | 11/1970 |
| GB | 588100 A | 5/1947 |

(Continued)

*Primary Examiner* — Jack Yip
(74) *Attorney, Agent, or Firm* — Blank Rome LLP

(57) ABSTRACT

A vehicle simulator having a pilot's cabin, a screen, and a moving system, which is suited to move the pilot's cabin in the space. The moving system has a fixed base arranged horizontally, a mobile platform which supports the pilot's cabin and rests on the fixed base so as to freely slide on the fixed base itself, and at least one actuator device, which is mechanically connected to the mobile platform. The actuator device has at least one flexible thread-like element which is mechanically connected to the mobile platform, and a motorized mechanism, which is suited to apply a pulling force to the flexible thread-like element, so as to always keep the flexible thread-like element in tension and, when needed, pull the mobile platform towards an edge of the fixed base.

26 Claims, 33 Drawing Sheets

(56) References Cited

U.S. PATENT DOCUMENTS

| | | | | |
|---|---|---|---|---|
| 6,732,609 B2* | 5/2004 | Asai | ............... | B23Q 1/621 |
| | | | | 74/490.04 |
| 9,108,360 B2* | 8/2015 | Comb | ............... | F16H 19/06 |
| 9,847,045 B2* | 12/2017 | Campolo | ............ | A61H 1/0274 |
| 2004/0124803 A1* | 7/2004 | Rodnunsky | ............ | B66C 13/08 |
| | | | | 318/649 |
| 2004/0146388 A1* | 7/2004 | Khajepour | ............ | B25J 17/0266 |
| | | | | 414/680 |
| 2005/0087089 A1* | 4/2005 | Rodnunsky | ............ | B61B 7/04 |
| | | | | 104/112 |
| 2005/0116188 A1* | 6/2005 | Yagi | ............... | G03B 42/02 |
| | | | | 250/591 |
| 2013/0045812 A1* | 2/2013 | Garner | ............ | A63G 19/20 |
| | | | | 472/97 |
| 2013/0126457 A1* | 5/2013 | Sturm, Jr. | ............ | B66C 13/08 |
| | | | | 212/318 |
| 2015/0020620 A1* | 1/2015 | Garner | ............ | A63B 21/0058 |
| | | | | 74/37 |
| 2018/0218630 A1* | 8/2018 | Minen | ............... | G09B 9/04 |

FOREIGN PATENT DOCUMENTS

| | | | |
|---|---|---|---|
| GB | 611770 A | 11/1948 | |
| GB | 2025866 A | 1/1980 | |
| GB | 2487369 A | 7/2012 | |
| WO | WO 2014/198861 A1 | 12/2014 | |

* cited by examiner

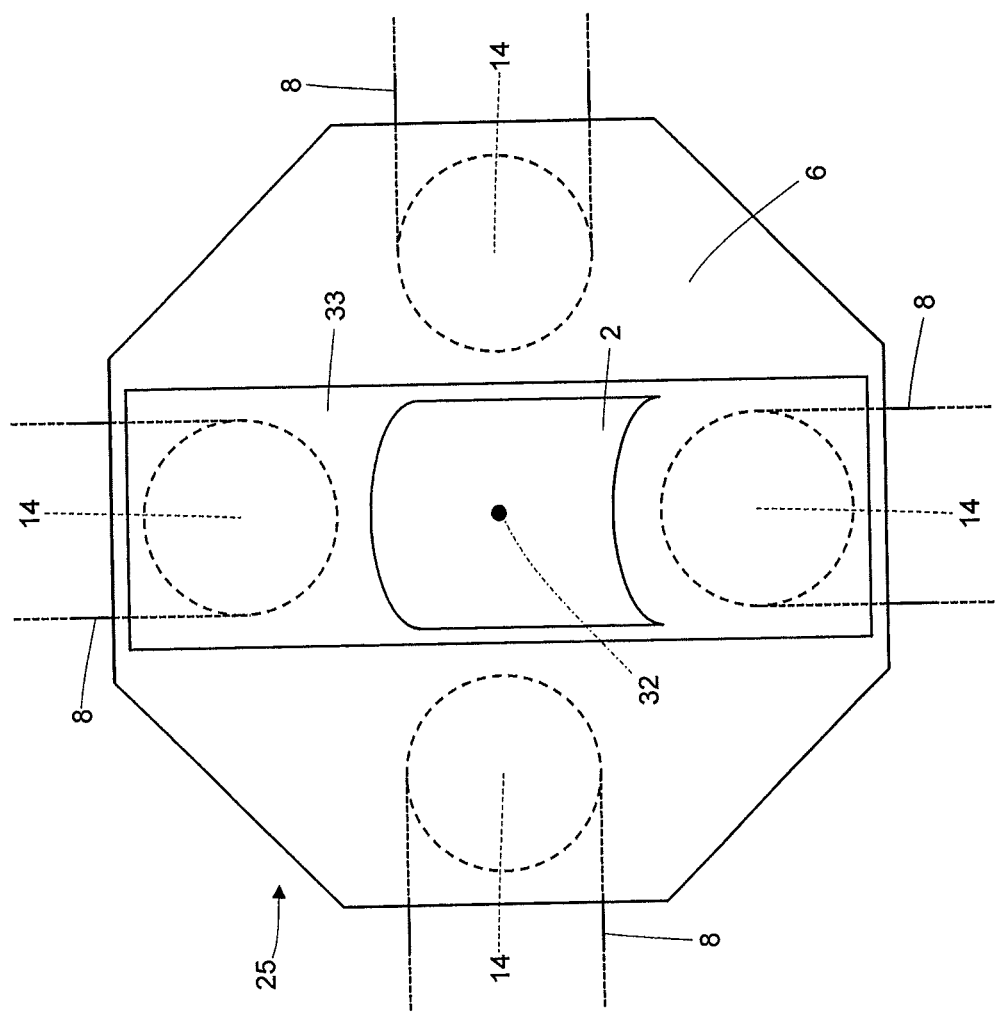

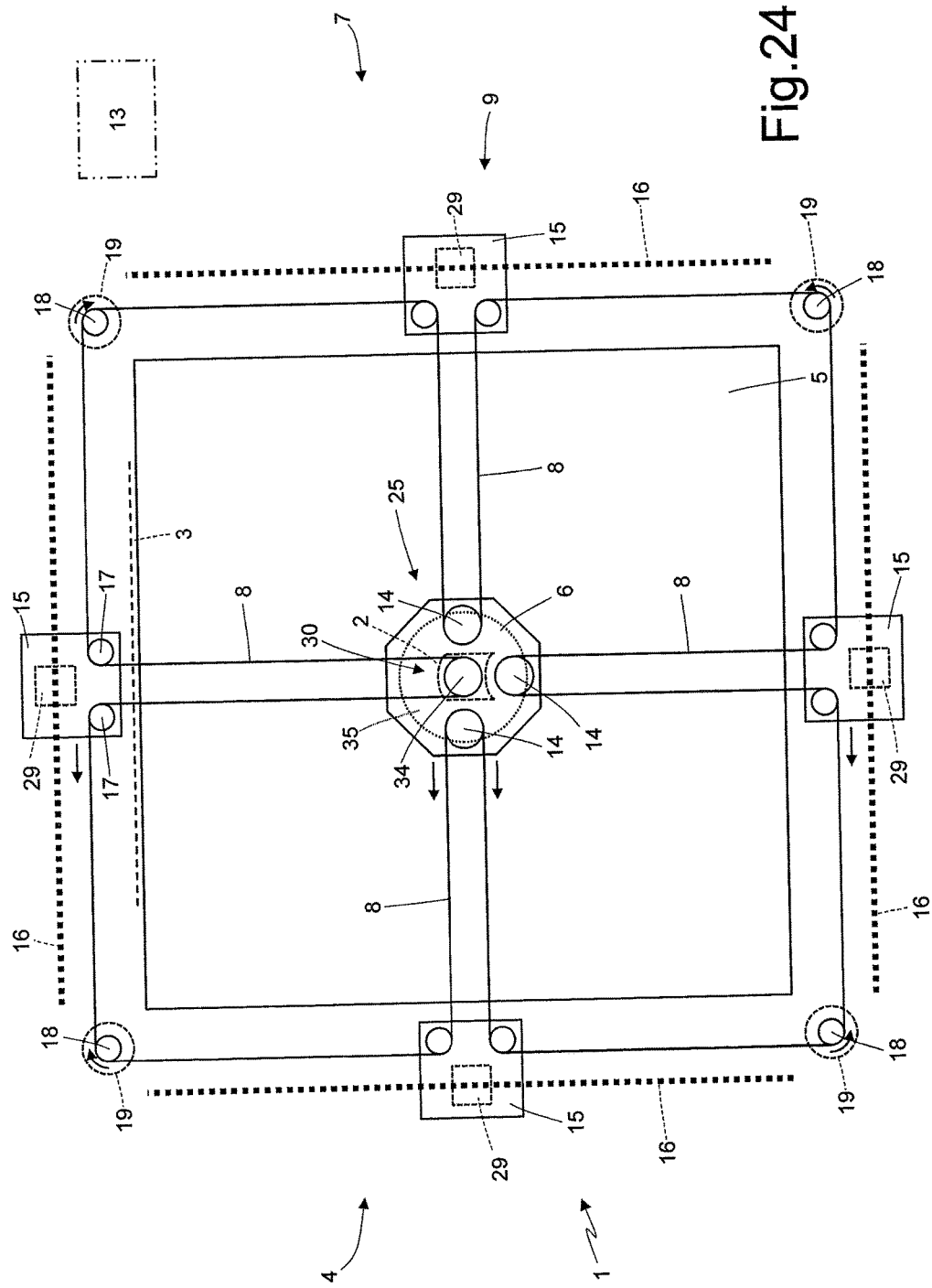

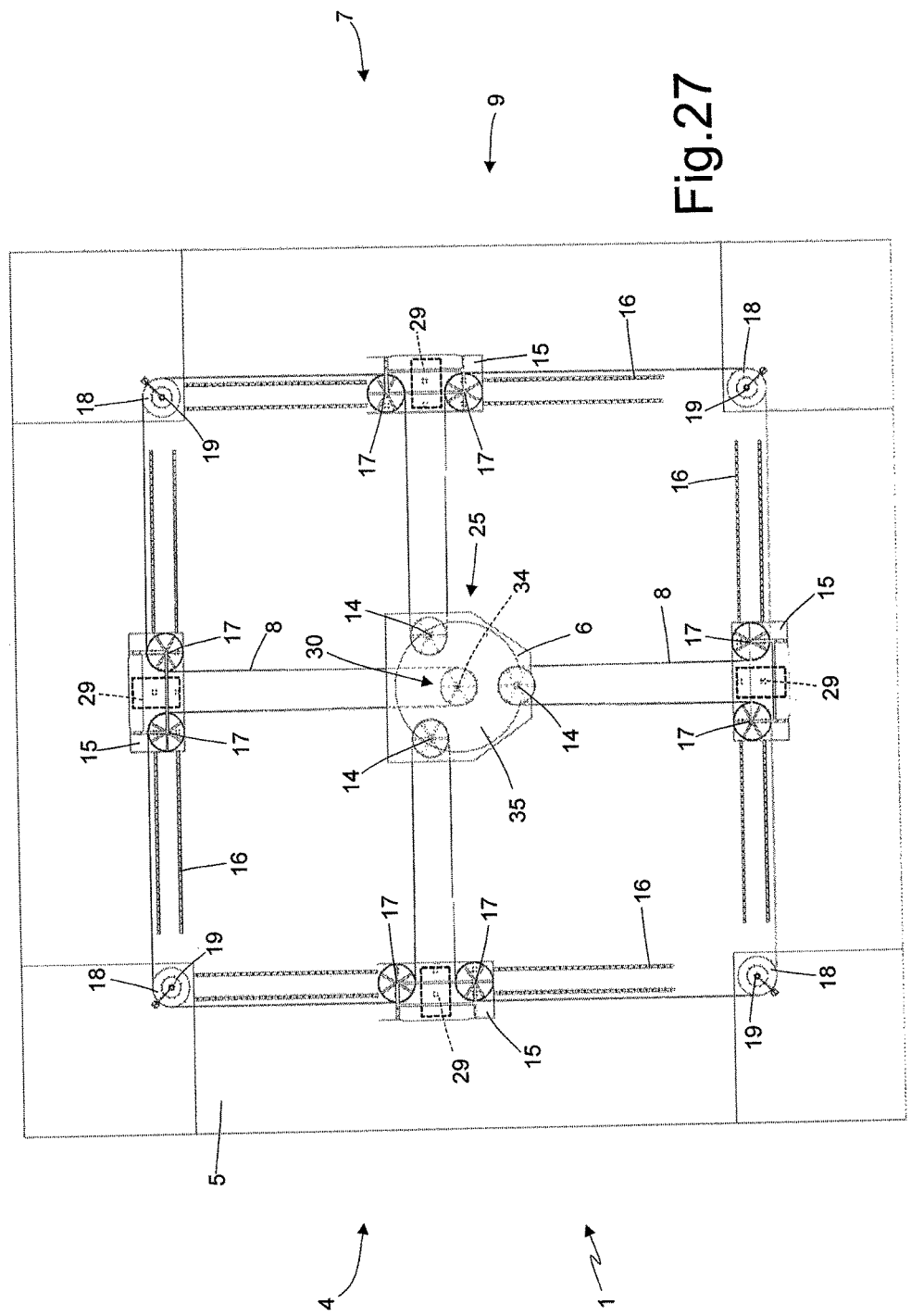

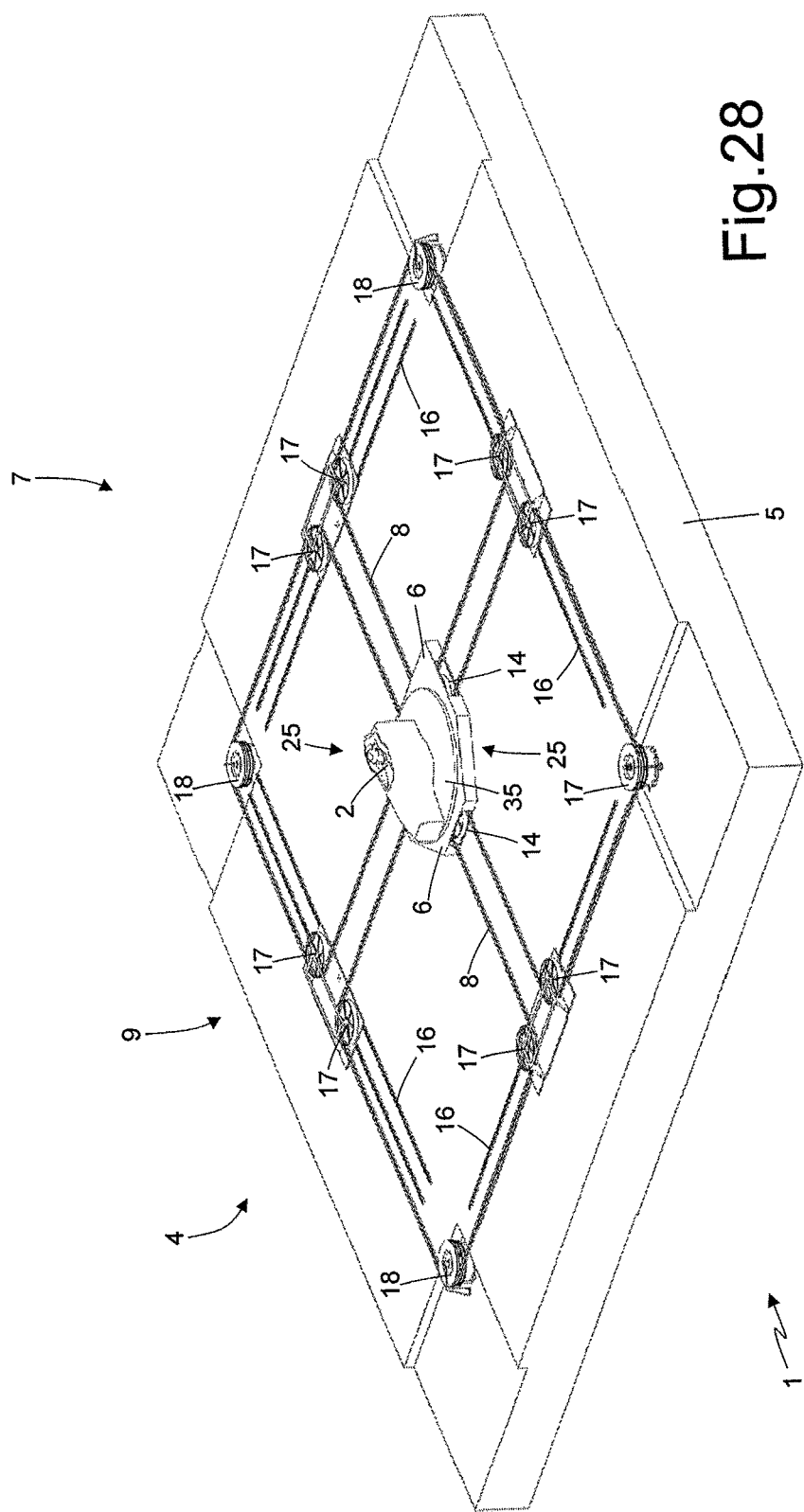

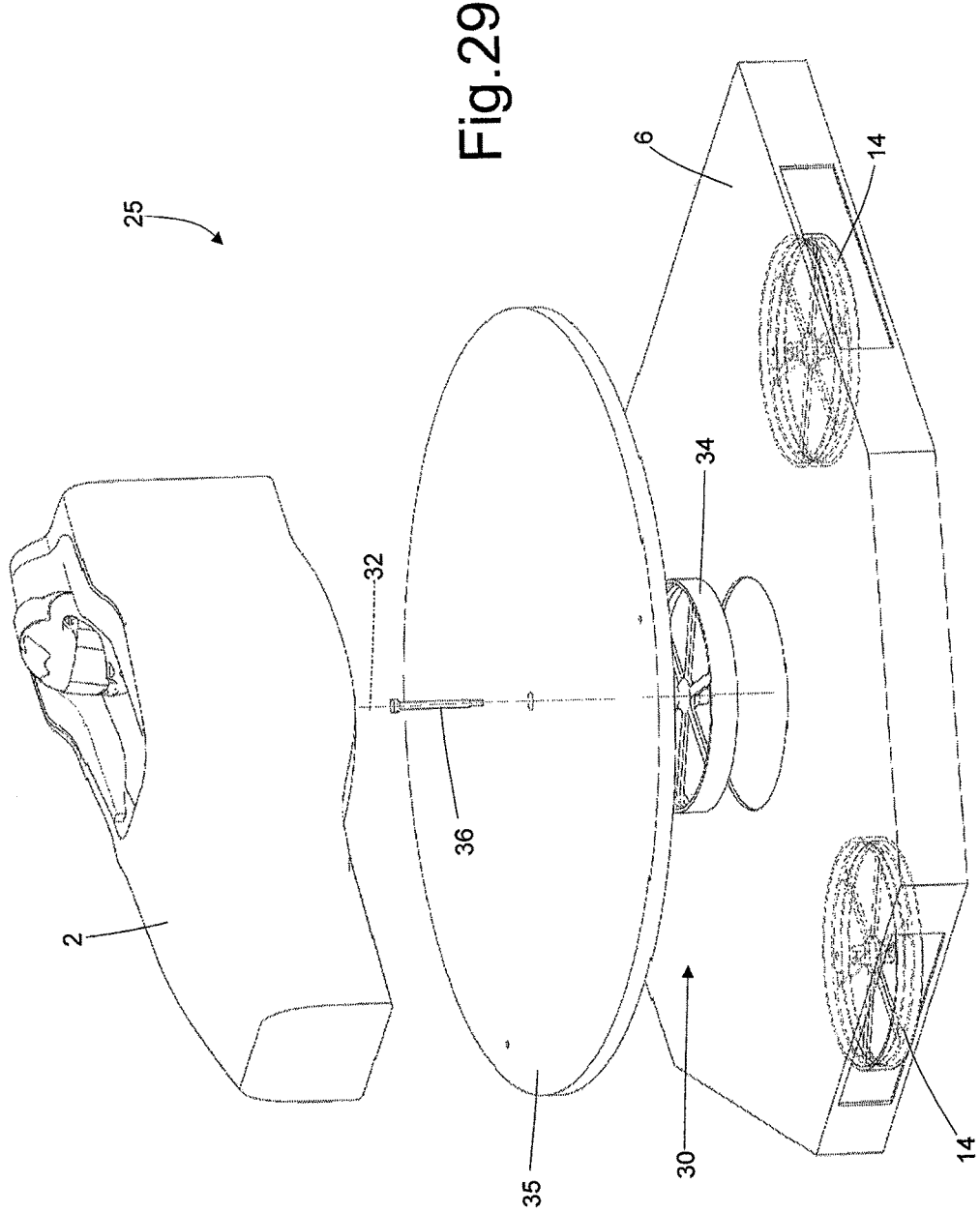

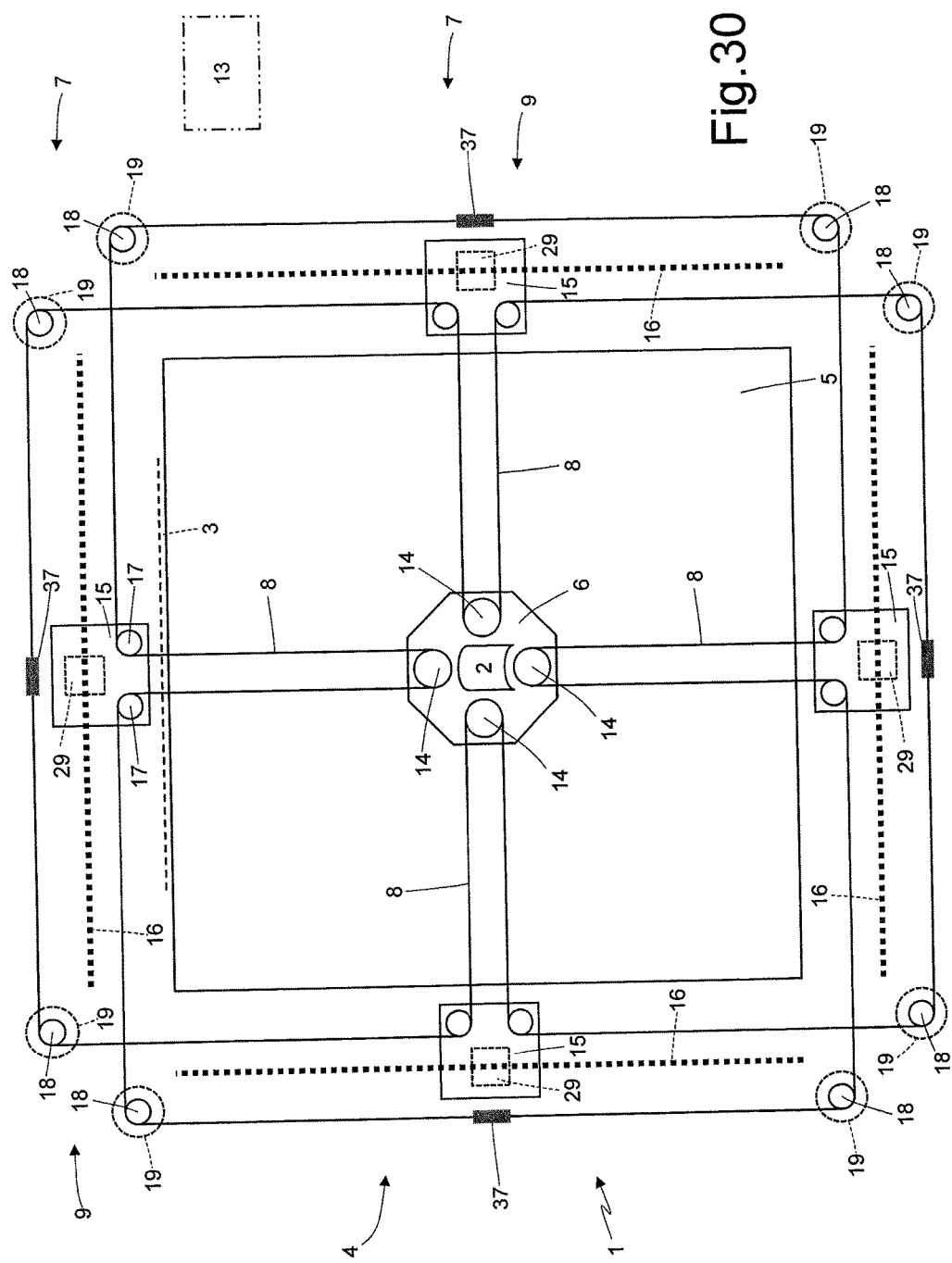

VEHICLE SIMULATOR WITH A MOVING SYSTEM WITH TENSIONED ROPES

TECHNICAL FIELD

The present invention relates to a vehicle simulator.

PRIOR ART

A vehicle simulator is used to virtually reproduce the movement of a vehicle, both to train a pilot to drive the vehicle and to test how the vehicle behaves in completely safe conditions, without having to produce or use an example of the vehicle.

A vehicle simulator comprises a pilot's cabin, which looks like an actual pilot's cabin and is suited to accommodate at least one pilot of the vehicle, at least one screen, which is arranged in front of the pilot's cabin to show the pilot a virtual reproduction of the real world surrounding the vehicle (the screen can be integral to the pilot's cabin or not), and a moving system, which supports the pilot's cabin and is suited to move the pilot's cabin in the space, so as to impart to the pilot's cabin movements that are consistent with the simulation of the movement of the vehicle.

The moving system, which is used to move the pilot's cabin, is complicated, bulky and expensive, as it must be able to impart quick and precise movements (in complete safety, since a person is involved) to a bulky and heavy body (namely, the pilot's cabin, which, in use, has an overall mass of two or three hundreds kilograms in case of a simulator of a single-seater race car and, in use, has an overall mass that is widely greater than one ton in case of a simulator of an aircraft, such as a large airliner).

Patent Application GB2025866A discloses a simulating apparatus for producing simulated views of a scene from a model of the scene; the simulating apparatus moves the model of the scene relatively to a viewpoint (from which the simulated views are produced) above the model. Such simulating apparatus is used in a motor vehicle simulator in which a driving seat is mounted in a fixed position in front of a screen positioned to correspond to a windscreen of a motor vehicle; a trainee driver sits in the driving seat, views on the screen a view of a road produced by the simulating apparatus which corresponds to a view of a road seen through a windscreen and operates the controls as though driving a vehicle along the road viewed on the screen. Thanks to the action of the simulating apparatus, the operation of the controls causes the view to alter in accordance with the effect the controls concerned would have on the view through a windscreen in a real vehicle. This kind of motor vehicle simulator is quite simple, compact and inexpensive, but is not very appreciated by the drivers because it cannot transmit the real feeling of the driving (i.e. the movements of the vehicle).

SUMMARY OF THE INVENTION

The object of the present invention is to provide a vehicle simulator with a moving system for the pilot's cabin that is relatively simple, light and compact, though allows the pilot's cabin to make quick and wide movements.

According to the present invention, there is provided a vehicle simulator according to the appended claims.

BRIEF DESCRIPTION OF THE DRAWINGS

The present invention will now be described with reference to the accompanying drawings, which show a non-limiting embodiment thereof, wherein:

FIG. 23 is schematic plan view of a further moving system, which is interposed between a mobile platform and a pilot's cabin in the vehicle simulator according to the present invention;

FIG. 24 is a schematic plan view of a variant of the vehicle simulator of FIG. 21;

FIG. 27 is another schematic plan view of the vehicle simulator of FIG. 24;

FIG. 28 is a schematic perspective view of the vehicle simulator of FIG. 24;

FIG. 29 is a schematic and exploded perspective view of a mobile platform of the vehicle simulator of FIG. 24;

FIG. 30 is a schematic plan view of a further vehicle simulator according to the present invention;

PREFERRED EMBODIMENTS OF THE INVENTION

Figure 1:
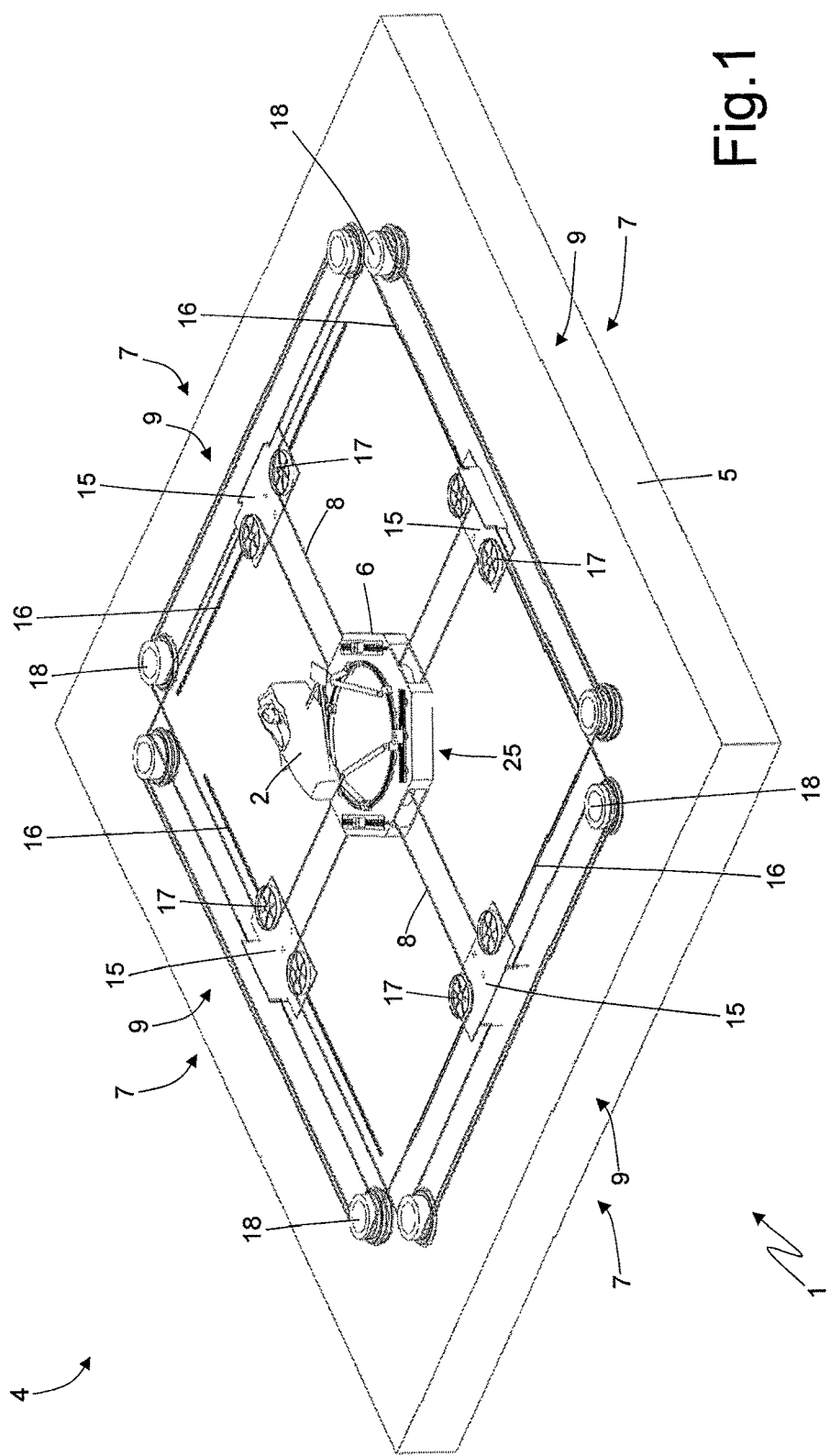
FIGS. 1 and 2 are two different schematic perspective views of a vehicle simulator according to the present invention.
Figure 2:
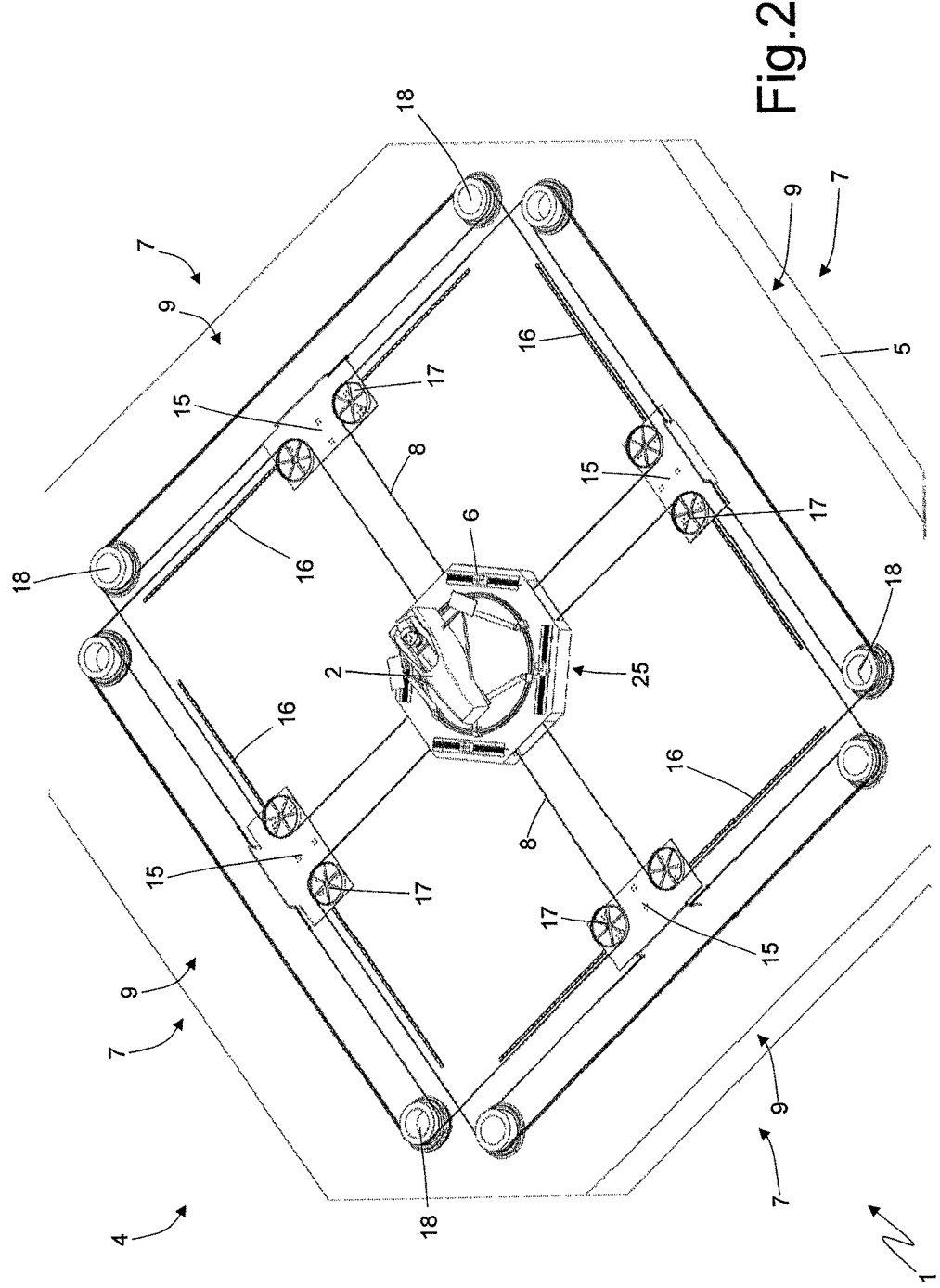
Figure 3:
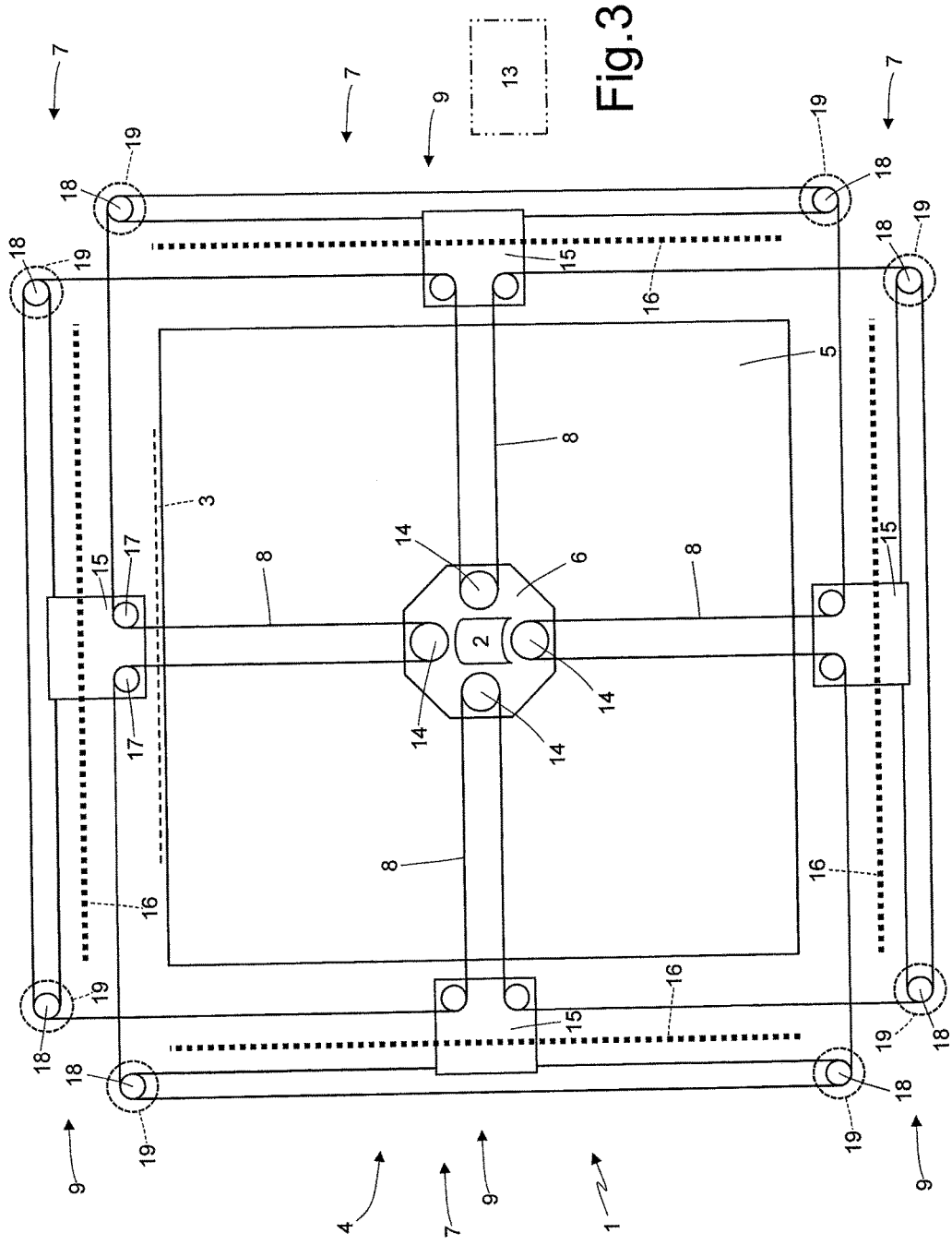
FIG. 3 is a schematic plan view of the vehicle simulator of FIGS. 1 and 2.

In FIGS. 1, 2 and 3, number 1 indicates, as a whole, a vehicle simulator to simulate the driving of a single-seater race car.

The vehicle simulator 1 comprises a pilot's cabin 2, which is suited to accommodate a pilot, namely is provided with a seat for the pilot and with the controls needed to drive the car (steering wheel, control and adjustment levers and buttons . . . ). Furthermore, the vehicle simulator 1 comprises (at least) a screen 3 (schematically shown in FIG. 3), which is arranged in front of (and, if necessary, at least partially on the side of) the pilot's cabin 2 to show the pilot a virtual reproduction of the real world surrounding the vehicle that is consistent with the simulation of the movement of the vehicle; obviously, the screen 3 can be arranged in a fixed position in front of the pilot's cabin 2, it can be integral to the pilot's cabin 2, so as to move together with the pilot's cabin 2 itself, or it can be integral to the pilot's helmet, so as to move together with his head. Finally, the vehicle simulator 1 comprises a moving system 4, which supports the pilot's cabin 2 and is suited to move the pilot's cabin 2 in the space, so as to impart to the pilot's cabin 2 itself movements that are consistent with the simulation of the movement of the vehicle.

The moving system 4 comprises a fixed base 5 arranged horizontally (namely, a fixed flooring, which is arranged horizontally and defines the area in which the pilot's cabin 2 can be moved by the moving system 4). Furthermore, the moving system 4 comprises a mobile platform 6, which supports the pilot's cabin 2 (namely, the pilot's cabin is mounted directly or indirectly on the mobile platform 6) and rests on the fixed base 5, so as to freely slide on the fixed base 5 itself; in other words, the fixed base 5 makes up a low-friction (or very-low-friction) support surface, on which the mobile platform 6 supporting the pilot's cabin 2 can slide (obviously, the mobile platform 6 has no mechanical constraint binding it to the fixed base 5 lying under it and it simply rests on the fixed base lying 5 under it). Finally, the moving system 4 shown in FIGS. 1, 2 and 3 comprises four actuator devices 7, each of which is arranged on the outside of the mobile platform 6 and is mechanically connected to the mobile platform 6, so as to impart to the mobile platform 6 itself a movement relative to the fixed base 5.

Each actuator device 7 comprises (at least) a flexible thread-like element 8 (for example, a rope or a belt made of a metal material, of a composite material, of a synthetic polymer and/or of a plastic material), which is mechanically connected to the mobile platform 6. Preferably (though not necessarily), each flexible thread-like element 8 has a rectangular cross section (namely, it has the shape of a belt). Also flexible thread-like elements should be selected to have the highest possible axial/lengthwise stiffness, so as to increase the controllability and bandwidth of the system. Furthermore, each actuator device 7 comprises a motorized mechanism 9, which is suited to apply a pulling force to the flexible thread-like element 8, so as to always keep the flexible thread-like element 8 in tension and, when needed, pull the mobile platform 6 towards an edge of the fixed base 5.

In the embodiment shown in FIGS. 1, 2 and 3, the moving system 4 comprises a plurality of actuator devices 7, which are arranged symmetrically around the mobile platform 6 and each of which comprises its own flexible thread-like element 8 connected to the mobile platform 6. By increasing the number of actuator devices 7, one clearly obtains a redundancy of actuator devices 7, which allows the position of the mobile platform 6 to be controlled in a more accurate and precise manner (in particular, by compensating, in a more effective and efficient manner, accidental errors and imperfections of the control system). Furthermore, by increasing the number of actuator devices 7, one can also control with great precision not only the position of the mobile platform 6 on the fixed base 5, but also the orientation of the mobile platform 6 on the fixed base 5 (namely, the yaw angle of the mobile platform 6, i.e. the rotation around a vertical rotation axis that is perpendicular to the fixed base 5).

The actuator devices 7 generate pulling forces that, through the flexible thread-like elements 8, act—all together—upon the mobile platform 6, which is a stiff body (hence, at least as a first approximation, completely free from deformations); the resultant of the pulling forces applied to the mobile platform 6 determines the overall force acting upon the mobile platform 6. Based on the desired movement of the mobile platform 6, the resultant of the pulling forces applied to the mobile platform 6 can be equal to zero and, therefore, keep the mobile platform 6 still and with all the flexible thread-like elements 8 remain still in tension, or the resultant of the pulling forces applied to the mobile platform 6 can be other than zero and, therefore, determine a movement of the mobile platform 6 itself with all the flexible thread-like elements 8 in tension.

There is provided a control unit 13 (schematically shown in FIG. 3), which controls the actuator devices 7 in a synchronized manner, so as to control the movement of the mobile platform 6 always keeping all the flexible thread-like elements 8 in tension; namely, the control unit 13 controls the motorized mechanisms 9 of the actuator devices 7 both to control the movement of the mobile platform 6 and to always keep all the flexible thread-like elements 8 in tension, namely to constantly apply to each flexible thread-like element 8 a pulling force other than zero. In particular, the movement (position, orientation, speed, acceleration) of the mobile platform 6 on the fixed base 5 is controlled by varying the pull of the flexible thread-like elements 8. The control unit 13, starting from the desired movement of the mobile platform 6 on the fixed base 5, determines the acceleration vector to be applied to the mobile platform 6 and then, from the acceleration vector to be applied to the mobile platform 6, the control unit 13 determines the resultant force to the applied to the mobile platform 6 (simply applying the relation among mass, force and acceleration); subsequently, the control unit 13 breaks out the resultant force to be applied to the mobile platform 6 into four components, namely one component for each actuator device 7, i.e. the control unit 13 determines the pulling forces that must be applied to each flexible thread-like element 8 and, therefore, determines the torques that must delivered by the corresponding motorized mechanisms 9.

According to a preferred (though not binding) embodiment, the control unit 13 controls each motorized mechanism 9 (namely, the electric motors 19 of each motorized mechanism 9) so as to apply to the corresponding flexible thread-like element 8 a tension (namely, a pulling force) that is always greater than a minimum value $T_{rope\_min}$ carried out beforehand or calculated according to the following equation:

$$T_{rope\_min} \leq 4 \times f_n^2 \times L(t)^2 \times \rho$$

$f_n$ target natural oscillation frequency in [Hz] of the flexible thread-like element (8);

L(t) free length in [m] of the longest span of the flexible thread-like element (8);

$\rho$ linear density in [kg/m] of the flexible thread-like element (8).

Of course, each motorized mechanism 9 (namely, the motor 19 of the motorized mechanism 9) is controlled so as to apply (as far as possible) to the flexible thread-like element 8 tension changes at frequencies (with some margin) below the target natural oscillation frequency $f_n$ of the flexible thread-like element 8; or, from a different point of view, the target natural oscillation frequency $f_n$ of the flexible thread-like element 8 is the maximum value of frequency at which each motorized mechanism 9 (namely, the motor 19 of the motorized mechanism 9) applies (as far as possible) tension changes to the flexible thread-like element 8. In other words, in every instant, a corresponding minimum value $T_{rope\_min}$ of the pull is calculated for each flexible thread-like element 8 as a function of the target natural oscillation frequency $f_n$ and the corresponding motorized mechanism 9 (namely, the motor 19 of the motorized mechanism 9) is controlled so as to apply to the flexible thread-like element 8 a tension that is always greater than the minimum value $T_{rope\_min}$ and so as to apply (as far as possible) to the flexible thread-like element 8 tension changes at a frequency (with some margin) below the target natural oscillation frequency $f_n$ of the flexible thread-like element 8. In this way, one can make sure that each flexible thread-like element 8 is never subject to a mechanical stress that is able to produce transverse resonance phenomena in the flexible thread-like element 8 itself, since the natural oscillation frequency of the flexible thread-like element 8 (which increases as the pull applied to the flexible thread-like element 8 increases) is always greater than the frequency with which the motorized mechanism 9 acts upon the flexible thread-like element 8, namely the frequency with which the flexible thread-like element 8 is excited due to a (potential) change of the pulling force applied to the flexible thread-like element 8 itself. In other words, the frequency content inputted by the motorized mechanism 9 must be lower than the natural oscillation frequency of the flexible thread-like element 8 to not excite the transverse resonant mode of the flexible thread-like element 8.

In an actual real time system it is impossible to remove all of the frequency content at or above a particularly frequency (i.e. the target natural oscillation frequency $f_n$ of the flexible thread-like element 8), thus each motorized mechanism 9 (namely, the motor 19 of the motorized mechanism 9) is controlled so as to apply (as far as possible, i.e. principally/predominantly) to the flexible thread-like element 8 tension changes at frequencies (with some margin) below the target natural oscillation frequency $f_n$ of the flexible thread-like element 8 while attenuating frequencies at, near or above the target natural oscillation frequency $f_n$ to such an extent that the transverse resonant modes of the flexible thread-like element 8 are not excited; however, it is impossible to completely eliminate tension changes at frequencies at, near or above the target natural oscillation frequency $f_n$ of the flexible thread-like element 8 and thus there are present residual (and fully undesired) tension changes at frequencies at, near or above the target natural oscillation frequency $f_n$ of the flexible thread-like element 8. In any case, the frequency content at, near or above the target natural oscillation frequency $f_n$ of each flexible thread-like element 8 is greatly attenuated by a filter, or kept to a minimum by careful design of the input signal, to such an extent that it doesn't cause problems (i.e. to such a degree that it doesn't excite noticeable transverse resonance in the flexible thread-like element 8, which would impart unwanted accelerations on the pilot's cabin 2).

It should be pointed out that the four actuator devices 7 totally comprise eight electric motors 19, which are independent of one another and are coupled to the corresponding pulleys 18. The presence of eight independent electric motors allows the control unit 13 to have great freedom as to how to distribute the pulling forces applied by the flexible thread-like elements 8 to the mobile platform 6 and, therefore, it allows the control unit 13 to apply to the mobile platform 6 the desired movement and, at the same time, to apply to each flexible thread-like element 8 a tension (namely, a pulling force) other than zero and always greater than the minimum value $T_{rope\_min}$.

In the embodiment shown in attached figures the total free length of each flexible thread-like element 8 always remains constant and the moving system 4 has a constant geometry (the free length of each flexible thread-like element 8 is the length of the portion of the flexible thread-like element 8 which is free to warp, i.e. is free from mechanical constrains); in this embodiment, the moving system 4 is mechanically complicated, but it also has a behaviour that is always straightforward and, hence, easier to control.

According to FIGS. 1, 2 and 3, the moving system 4 comprises the fixed base 5 (in this embodiment, having an octagonal shape), the mobile platform 6, which supports the pilot's cabin 2 and rests on the fixed base 5 so as to freely slide on the fixed base 5 itself, and four actuator devices 7, each of which is arranged on the outside of the mobile platform 6 and is mechanically connected to the mobile platform 6, so as to impart to the mobile platform 6 itself a movement relative to the fixed base 5.

FIGS. 1, 2 and 3 shows—all together—the four actuator devices 7; however, different parts of the actuator devices 7 are vertically arranged on top of one another and, therefore, it is hard to distinguish them in the plan view shown; for this reason, FIGS. 4-7 singularly show the four actuator devices 7 (namely, each FIG. 4-7 shows a single actuator device 7).

According to FIGS. 4-7, each actuator device 7 comprises (at least) a flexible thread-like element 8 (for example, a rope/belt made of a metal material, of a composite material, of a synthetic polymer and/or of a plastic material), which is mechanically connected to the mobile platform 6. Furthermore, each actuator device comprises a motorized mechanism 9, which is suited to apply a pulling force to the flexible thread-like element 8, so as to always keep the flexible thread-like element 8 in tension and, when needed, pull the mobile platform 6 towards an edge of the fixed base 5.

Each motorized mechanism 9 comprises a pulley 14, which is mounted on the mobile platform 6 so as to be an idler pulley (meaning that it can freely rotate without any constraint) and around which the flexible thread-like element 8 is wound; in particular, each flexible thread-like element 8 is wound by 180° around the corresponding pulley 14 and, therefore, in the area of the mobile platform 6, the flexible thread-like element 8 is "U"-shaped. Each motorized mechanism 9 comprises a main slide 15, which is mounted so as to move along a corresponding straight guide 16, is arranged in front of the pulley 14 of the mobile platform 6, and supports two idler pulleys 17, which are mounted on the main slide 15 itself and around which a corresponding side of the flexible thread-like element 8 is wound by 90° (thus forming an "L" shape), so that the two sides of the flexible thread-like element 8 are deflected in opposite directions.

Each motorized mechanism 9 comprises two secondary slides 15, each of which is arranged on one side of the main slide 15, is coupled to a corresponding pulley 17, is mounted so as to slide along a corresponding straight guide 16, and is fixed to an end of the flexible thread-like element 8; the two straight guides 16 of the secondary slides 15 are perpendicular to the straight guide 16 of the main slide 15. Each motorized mechanism 9 comprises two initial pulleys 18 (winches/capstans), each of which is interposed between the main slide 15 and a corresponding secondary slide 15 and has the flexible thread-like element 8 wound around it by 90°. Each motorized mechanism comprises two final pulleys 18 (winches/capstans), each of which is interposed between a corresponding pulley 18 and a corresponding secondary slide 15 and has the flexible thread-like element 8 wound around it by 180°.

In the embodiment shown in FIGS. 1-5, all pulleys 18 (both the initial pulleys 18 and the final pulleys 18) are motor-driven so as to rotate around central axis of their own due to the thrust of an electric motor 19. According to a different embodiment, which is not shown, each motorized mechanism 9 comprises two electric motors, each of which is coupled to a secondary slide 15 and is suited to move the secondary slide 15 along the corresponding straight guide 16; preferably, the electric motors coupled to the secondary slides 15 are linear electric motors.

The flexible thread-like element 8 is wound around each initial pulley 18 by 90°; alternatively, in order to have a better control on the part of the electric motor 19 (namely, in order to avoid an undesired slipping between the initial pulley 18 and the flexible thread-like element 8), the flexible thread-like element 8 could be wound around each initial pulley 18 by 450° (namely, 90°+360°) or by 810° (namely, 90°+360°+360°) or even more. The flexible thread-like element 8 is wound around each final pulley 18 by 180°; alternatively, in order to have a better control on the part of the electric motor 19 (namely, in order to avoid an undesired slipping between the final pulley 18 and the flexible thread-like element 8), the flexible thread-like element 8 could be wound around each final pulley 18 by 540° (namely, 180°+360°) or by 900° (namely, 180°+360°+360°) or even more.

As already mentioned above, the four actuator devices 7 share part of the components. In particular, the moving system 4 comprises, altogether, four slides, which are shared by the four actuator devices 7 in such a way that each slide 15 acts as the main slide 15 only for one actuator device 7 and as a secondary slide for two different actuator devices 7. Furthermore, the four actuator devices 7 are divided into two pairs, so that the two actuator devices of each pair pull the mobile platform 6 in the same direction and in opposite ways; namely, the two actuator devices 7 shown in FIGS. 4 and 5 form a first pair and the two actuator devices 7 shown in FIGS. 6 and 7 form a second pair. The two actuator devices 7 of each pair share the same pulleys 18 (both the initial pulleys 18 and the final pulleys 18) and, as a consequence, the same electric motors 19; therefore, the moving system 4 comprises, altogether, eight electric motors 19. In other words, around each pulley 18 (both the initial pulleys 18 and the final pulleys 18) there are wound (obviously, in different positions, namely one in an upper position and the other in a lower position) two different flexible thread-like elements 8 of two different actuator devices 7.

In the embodiment shown in FIGS. 1-7, each flexible thread-like element 8 has a constant total free length; in other words, the sum of the free lengths of each flexible thread-like element 8 is constant (the single free length L of each flexible thread-like element 8 can vary, but the sum of the free lengths of each flexible thread-like element 8 is always constant) apart from due to elastic extension and contraction due to changes in tension. According to a preferred (though not binding) embodiment, each actuator device 7 comprises at least one mechanical puller (for example, a turnbuckle), which pretensions the corresponding flexible thread-like element 8 regardless of the action of the motorized mechanism 9, namely it applies to the flexible thread-like element 8 a tension even when the motorised mechanism is inactive; in this way, part of the tension of the flexible thread-like elements 8 is generated by the mechanical pullers and, therefore, it does not need to be generated by the motorized mechanisms 9 (namely, by the electric motors 19 of the motorized mechanisms 9), which, hence, are subject to a smaller load. A smaller load is beneficial because a small motor can be used, which has less inertia, which increase the controllability and bandwidth of the system. Each mechanical puller can be coupled to an end of the corresponding flexible thread-like element 8, namely it can be interposed between the end of the flexible thread-like element 8 and the relative anchoring point; obviously, for each flexible thread-like element 8, there can be provided one single mechanical puller coupled to one single end of the flexible thread-like element 8, or there can be provided two mechanical pullers, which are coupled to both ends of the flexible thread-like element 8. According to an alternative embodiment, the mechanical puller can be constituted by a movable pulley 18, which can be moved along a guide (of course when the vehicle simulator 1 is not operative) towards the centre of the platform 5 to reduce the pretension of the flexible thread-like element 8 or can be moved in the opposite direction (i.e. away from the centre of the platform 5) to increase the pretension of the flexible thread-like element 8; this embodiment is preferable when the flexible thread-like element 8 is closed on itself in a ring shape (as better disclosed below).

It should be pointed out that the presence of the mechanical pullers is possible thanks to the fact that the total free length of each flexible thread-like element 8 is constant. Furthermore, it is important to point out that the mechanical pullers apply to the flexible thread-like elements 8 a tension which is always present partially relieving the motorized mechanisms 9, which have to be always controlled to avoid reducing excessively (i.e. below the corresponding minimum value $T_{rope\_min}$) the tension present in each thread-like element 8.

Figure 4:
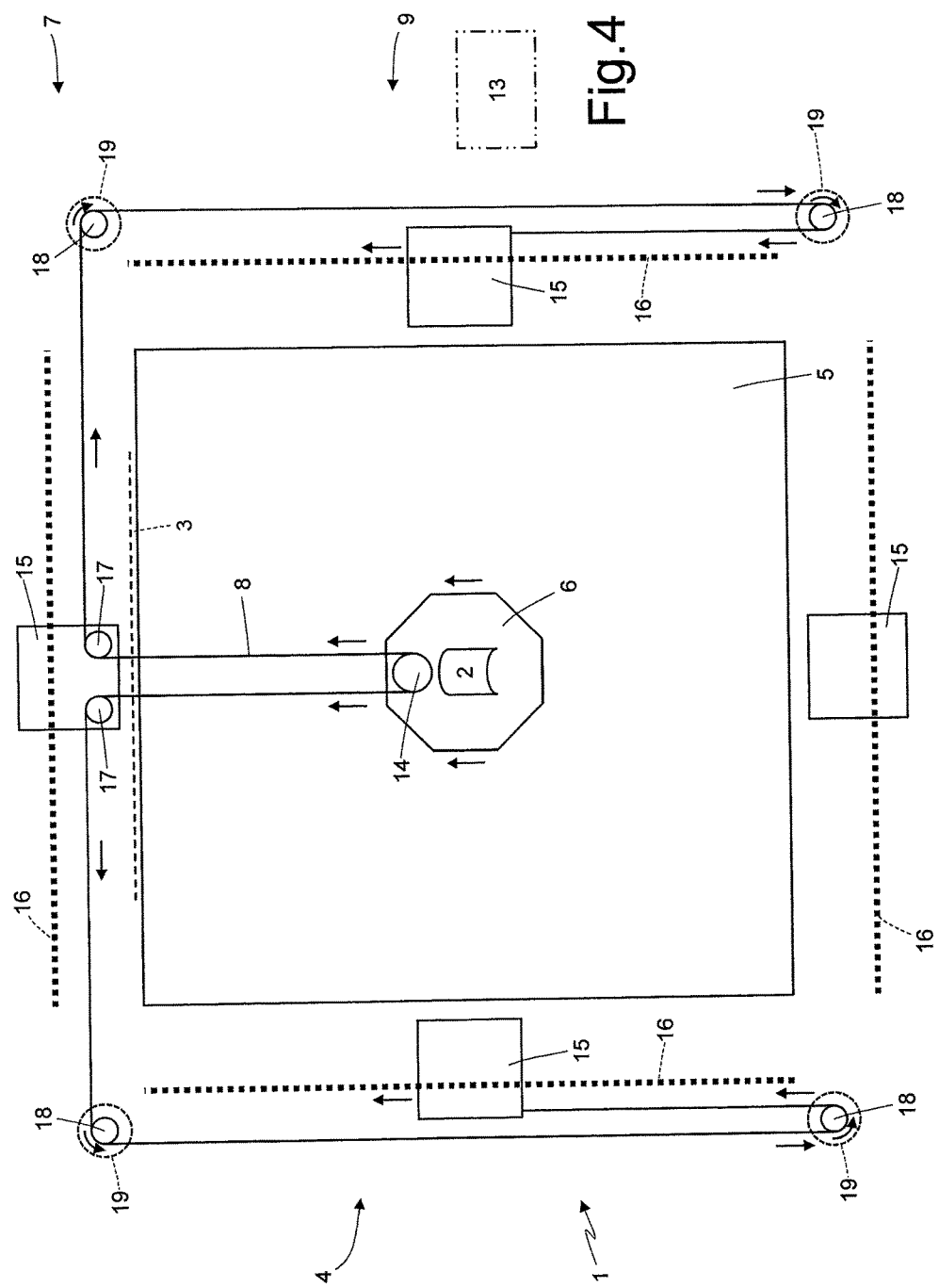
FIGS. 4-7 are four plan views of corresponding actuator devices of the vehicle simulator of FIGS. 1 and 2.
Figure 5:
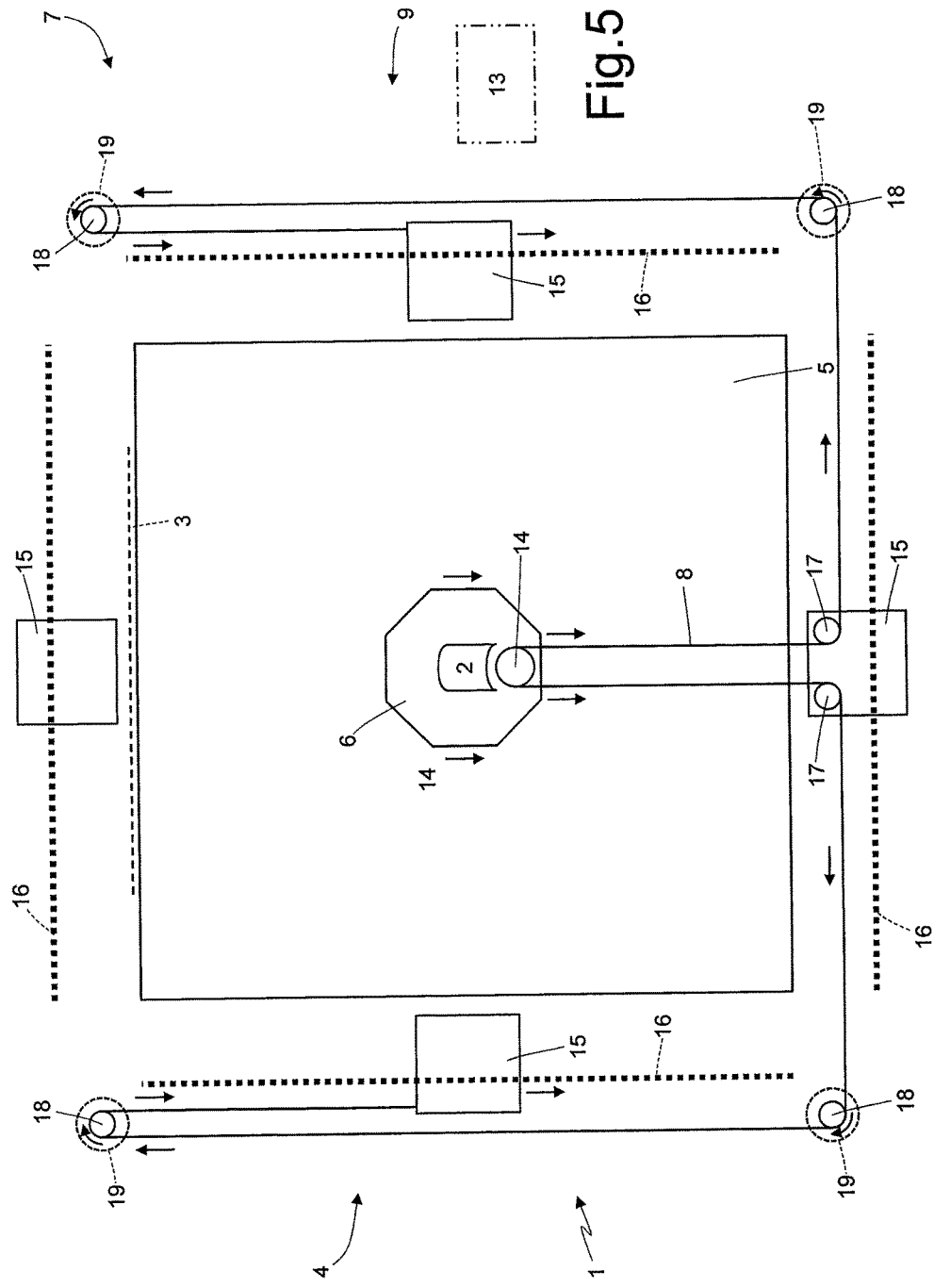
Figure 6:
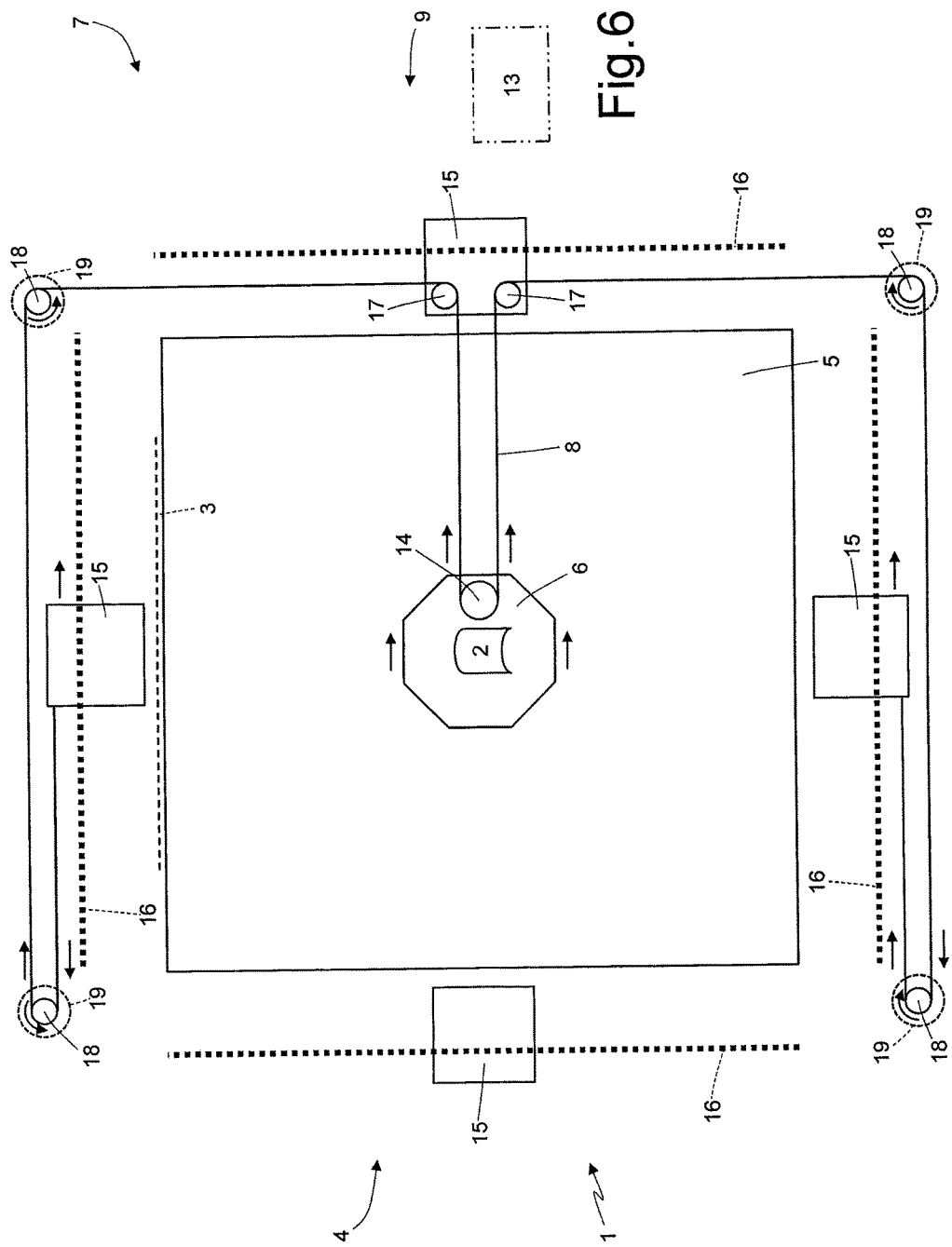
Figure 7:
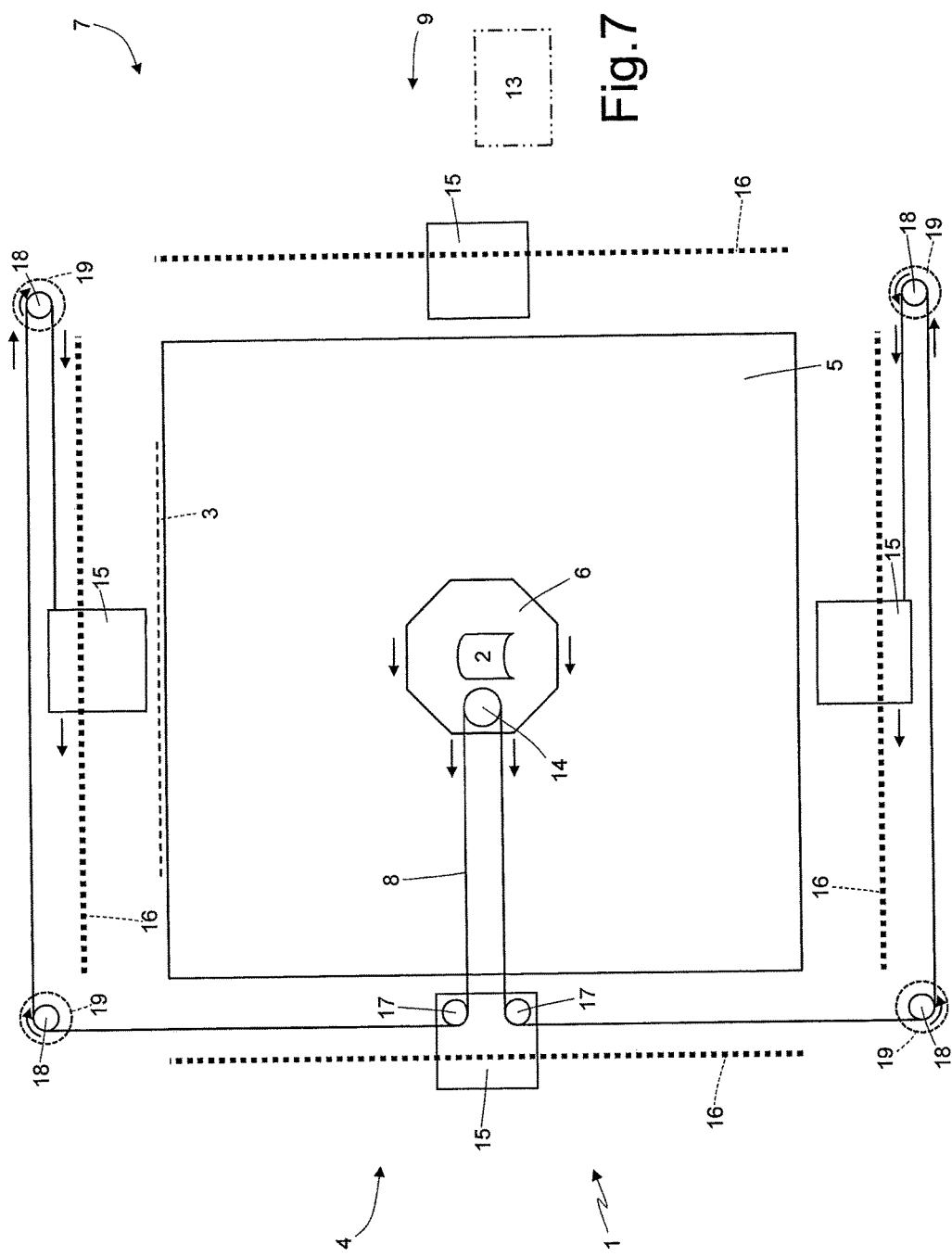

According to FIG. 4, in order to move the mobile platform according to the indication of the arrows (namely, towards the upper edge of FIG. 4), the four electric motors 19 must rotate all together and in a synchronized manner, so as to shorten the two branches of the flexible thread-like element 8 arranged between the main slide 15 and the pulley 14, thus extending, by the same amount, the two branches of the flexible thread-like element 8 arranged between the final pulleys 18 and the secondary slides 15. At the same time, the flexible thread-like element 8 of the actuator device 7 of the same pair of actuator devices 7 (shown in FIG. 5) is subject to an equal and opposite variation, thus extending the two branches of the flexible thread-like element 8 arranged between the main slide 15 and the pulley 14 and the shortening, by the same amount, the two branches of the flexible thread-like element 8 arranged between the final pulleys 18 and the secondary slides 15. At the same time, the flexible thread-like elements 8 of the actuator devices 7 of the other pair of actuator devices 7 (shown in FIGS. 6 and 7) do not vary the length of the two branches arranged between the main slide 15 and the pulley 14, but there is anyway a sliding of the flexible thread-like elements 8 to accompany the movement of the mobile platform 6 and of the slides 15.

In this embodiment the control unit preferably 13 controls each motorized mechanism 9 (namely, the electric motor 19 of each motorized mechanism 9) so as to apply to the corresponding flexible thread-like element 8 a tension (namely, a pulling force) that is always greater than a minimum value $T_{rope\_min}$, so as to prevent the flexible thread-like element from being subject to resonance and, therefore, from causing undesired high-frequency oscillations of the mobile platform 6. In this embodiment, again, the control unit 13 controls the actuator devices 7 in a synchronized manner, so as to control the movement of the mobile platform 6, always keeping all flexible thread-like elements 8 in tension with a tension that is greater than the minimum value $T_{rope\_min}$. It should be pointed out that the presence of eight electric motors 19 allows the control unit 13 to have great freedom as to how to distribute the pulling forces applied by the flexible thread-like elements 8 to the mobile platform 6 and, therefore, it allows the control unit 13 to apply to the mobile platform 6 the desired movement and, at the same time, to apply to each flexible thread-like element 8 a tension (namely, a pulling force) other than zero and always greater than the minimum value $T_{rope\_min}$.

In the embodiment shown in FIGS. 1-5, each actuator device 7 comprises a single flexible thread-like element 8; however, if a greater overall stiffness of the moving system 4 were requested, each actuator device 7 could be provided with two or more flexible thread-like elements 8 arranged in parallel and vertically on top of one another. From another point of view, each flexible thread-like element 8 can consist of one single rope/belt, or it can consist of different ropes/belts next to and on top of one another; obviously, each rope/belt of the flexible thread-like element 8 follows the exact same path as the other ropes/belts of the same flexible thread-like element 8.

According to a different embodiment, which is not shown, not all pulleys 18 are motor-driven (namely, some pulleys 18 are not provided with corresponding electric motors 19 and, therefore, are idler pulleys). According to a further embodiment, which is not shown, all pulleys 18 are not provided with the corresponding electric motors 19 and, therefore, are idler pulleys and the function of the electric motors 19 is fulfilled by other motors that are directly coupled to the slides 15 and are suited to cause the slides 15 to move along the guides 16; preferably, linear electric motors are used, each coupled to a slide 15 to move the slide 15 along the corresponding guide 16.

Figure 8:
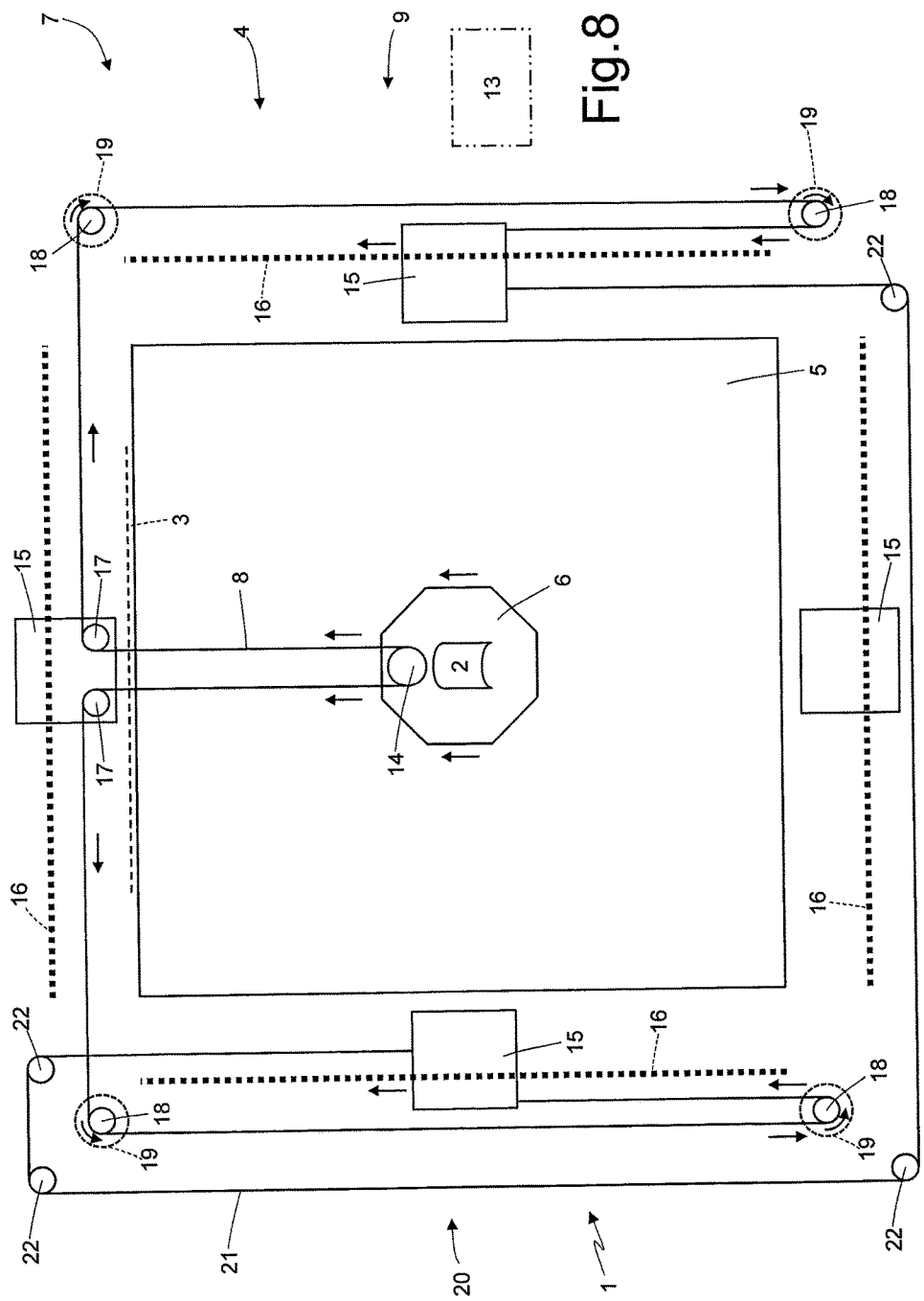
FIG. 8 is a schematic plan view of a variant of the vehicle simulator of FIGS. 1 and 2.

In the embodiment shown in FIG. 8, each motorized mechanism 9 comprises a constraining device 20, which is mechanically coupled to both secondary slides 15 and mechanically forces the secondary slides 15 to always remain aligned with one another. In other words, in the embodiment shown in FIGS. 1-7, in each motorized mechanism 9, the secondary slides 15 are free to move in opposite directions, thus loosing their alignment (namely, the two secondary slides 15 stop "facing" one another) and the control unit 13 must control the motorized mechanisms 9 (namely, the electric motors 19 of the moor-driven organs 9) to make sure that the two secondary slides 15 are always aligned with one another (a condition that is not essential, but is anyway preferable, as it makes the control of the moving system 4 simpler and more easy to foresee); each constraining device 20 introduces a further mechanical constraint, which prevents the corresponding secondary slides 15 from loosing their alignment, thus simplifying the control that has to be carried out by the control unit 13. In the embodiment shown in FIG. 8, each constraining device 20 comprises at least one flexible thread-like element 21, which, at its ends, is fixed to both secondary slides 15 and is wound around corresponding pulleys 22, which are mounted as idler pulleys in a fixed position. Obviously, in the entire vehicle simulator 1, there are only two constraining devices 20, each shared by two actuator devices 7 (i.e. the same for two actuator devices 7).

Figure 9:
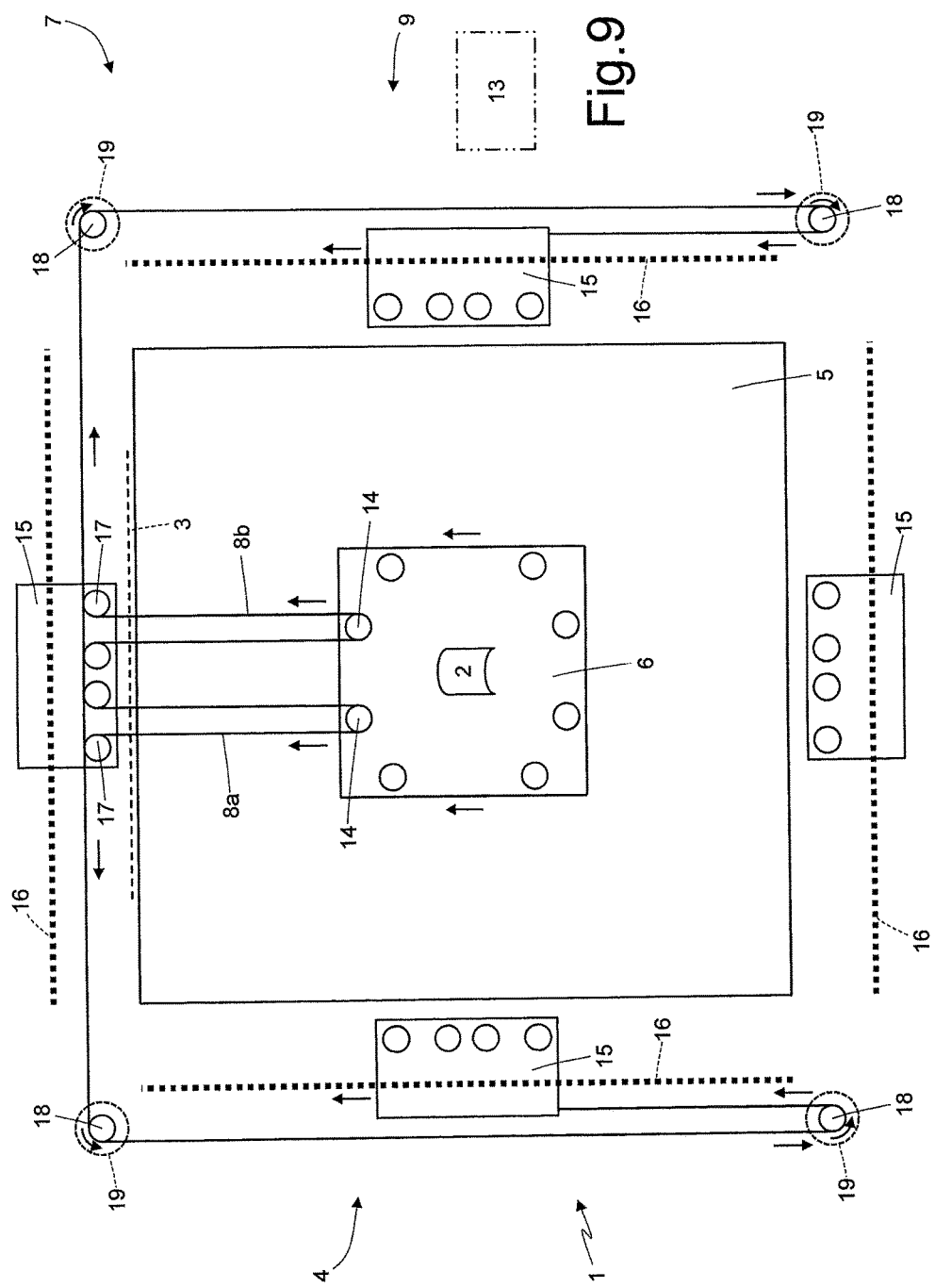
FIGS. 9, 10 and 11 are three schematic plan views of another variant of the vehicle simulator of FIGS. 1 and 2.
Figure 10:
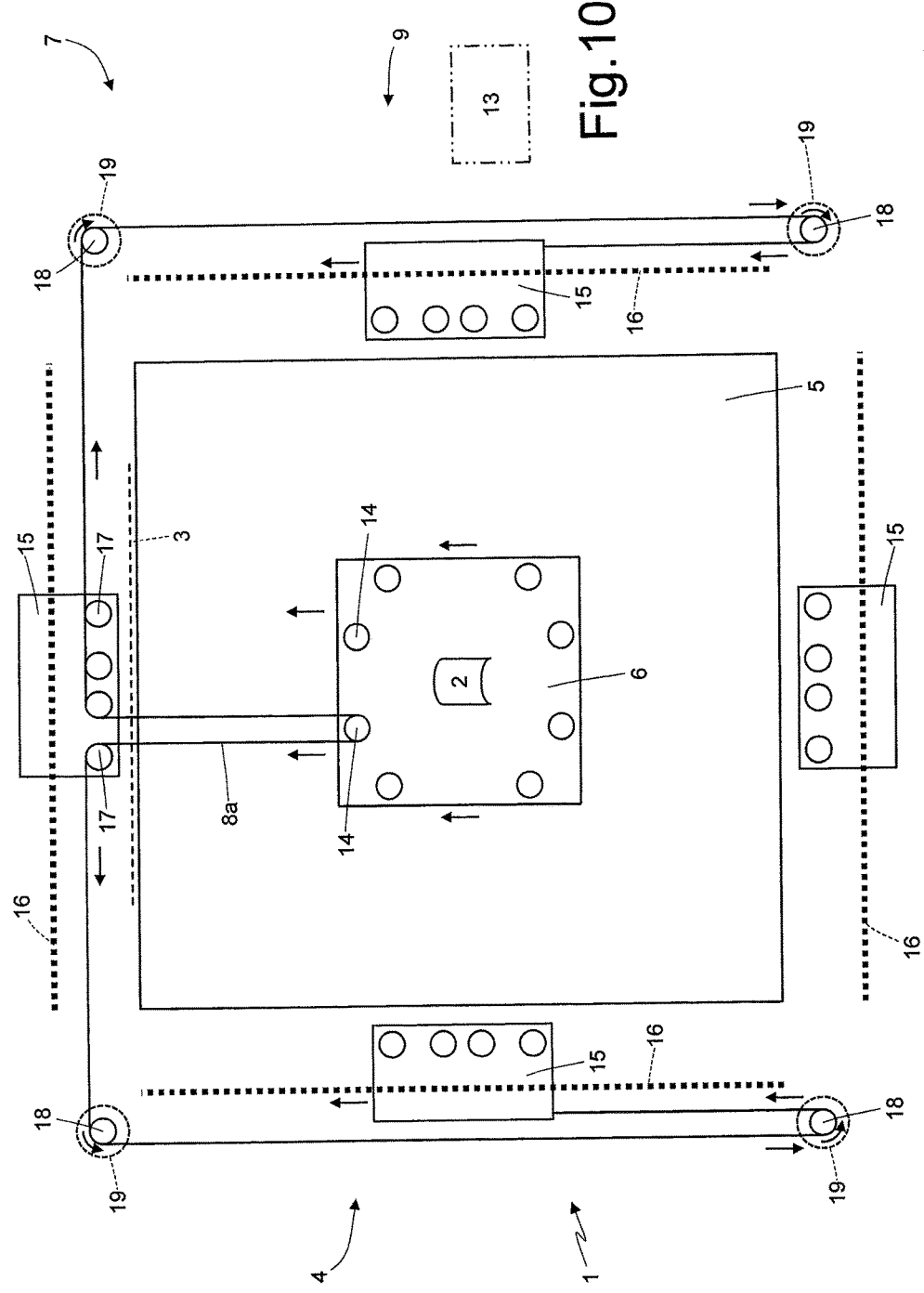
Figure 11:
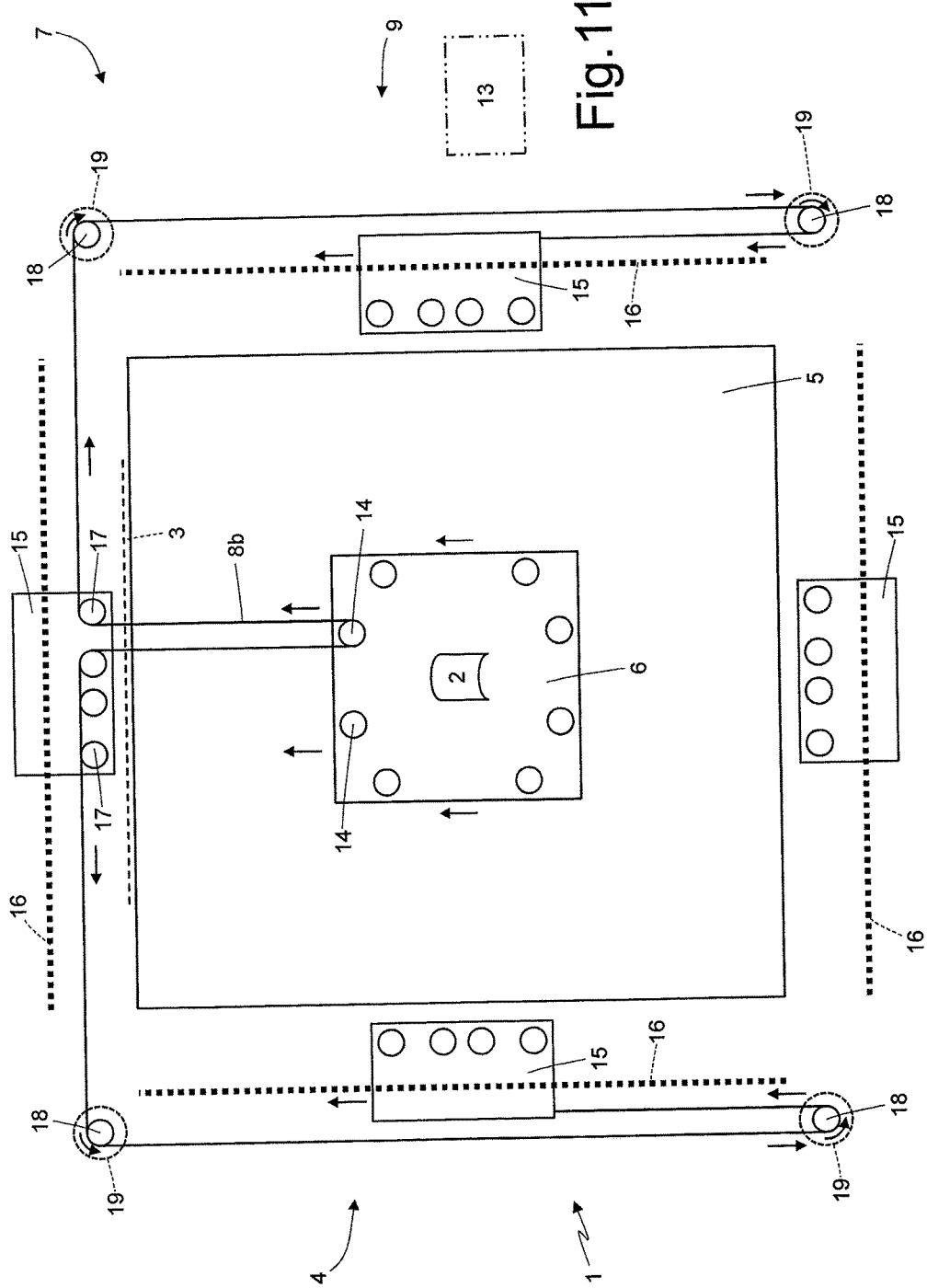

FIGS. 9, 10 and 11 show a variant of the moving system 4 shown in FIGS. 1-7; FIG. 9 shows a single actuator device 7 of the moving system 4 (similar to the actuator device 7 shown in FIG. 4), which is provided with two flexible thread-like elements 8a and 8b (partially vertically arranged on top of one another), FIG. 10 shows the actuator device 7 of FIG. 9 only with the flexible thread-like element 8a (namely, without the flexible thread-like element 8b), and FIG. 11 shows the actuator device 7 of FIG. 9 only the flexible thread-like element 8b (namely, without the flexible thread-like element 8a).

The moving system 4 shown in FIGS. 9, 10 and 11 has a double number of flexible thread-like elements 8, since each actuator device 7 uses two distinct flexible thread-like elements 8a and 8b, which are wound around two corresponding pulleys 14, which are independent and separate as well as mounted as idler pulleys on the mobile platform 6.

The moving system 4 shown in FIGS. 9, 10 and 11 is mechanically more complicated (since it uses two flexible thread-like elements 8a and 8b for each actuator device 7) and does not permit an active control of the yaw movement of the mobile platform 6 (namely, of the rotation of the mobile platform 6 around a vertical rotation axis that is perpendicular to the fixed base 5); on the other hand, though, the moving system 4 shown in FIGS. 9, 10 and 11 ensures a greater opposition to the undesired yaw movement of the mobile platform 6 (namely, to the undesired rotation of the mobile platform 6 around a vertical rotation axis that is perpendicular to the fixed base 5); the yaw movement of the mobile platform 6 is countered by the pull of four branches of corresponding flexible thread-like elements 8a and 8b, instead of being countered by the pull of two branches of one single flexible thread-like element 8.

Figure 12:
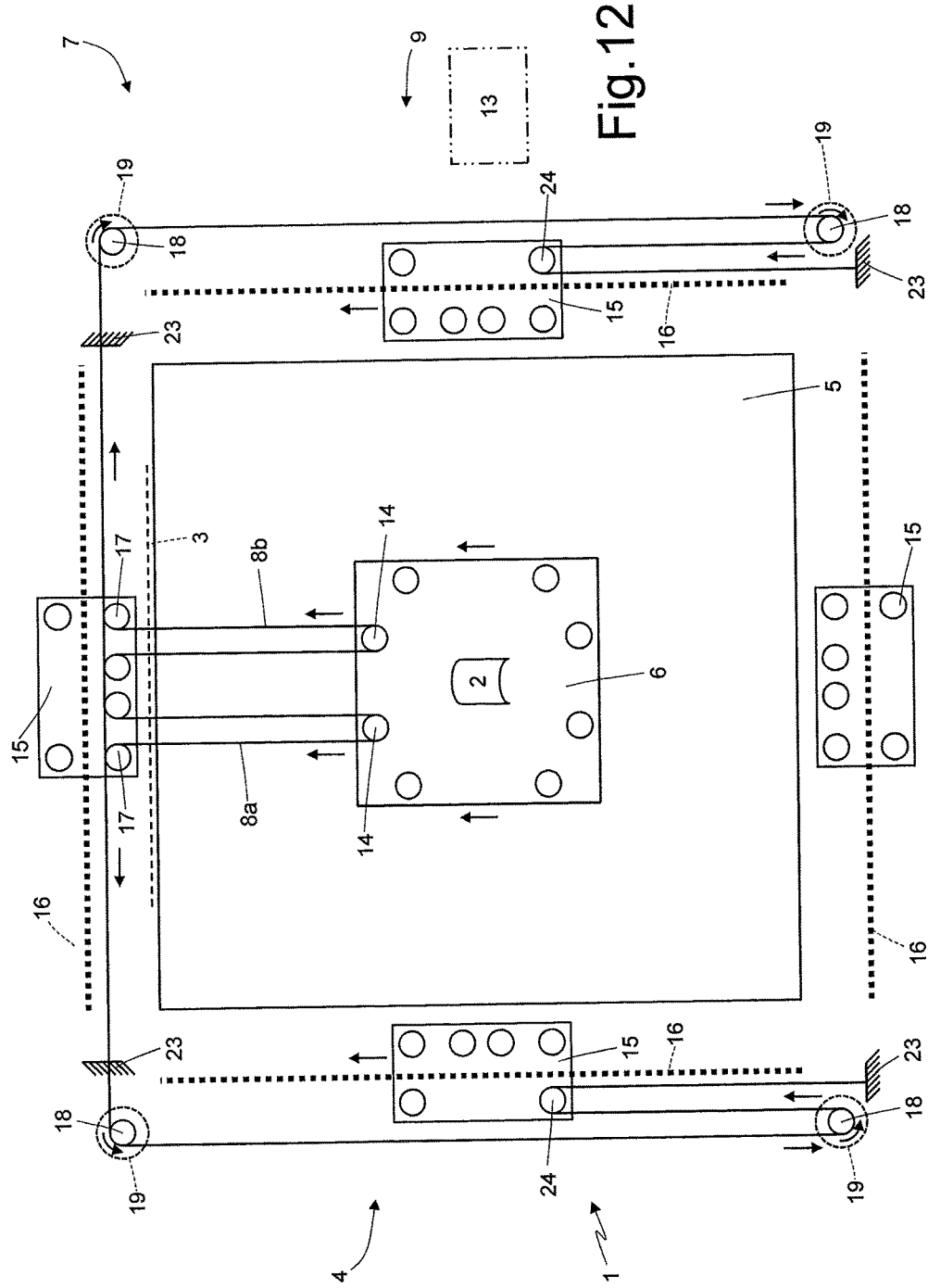
FIGS. 12, 13 and 14 are three schematic plan views of a further variant of the vehicle simulator of FIGS. 1 and 2.
Figure 13:
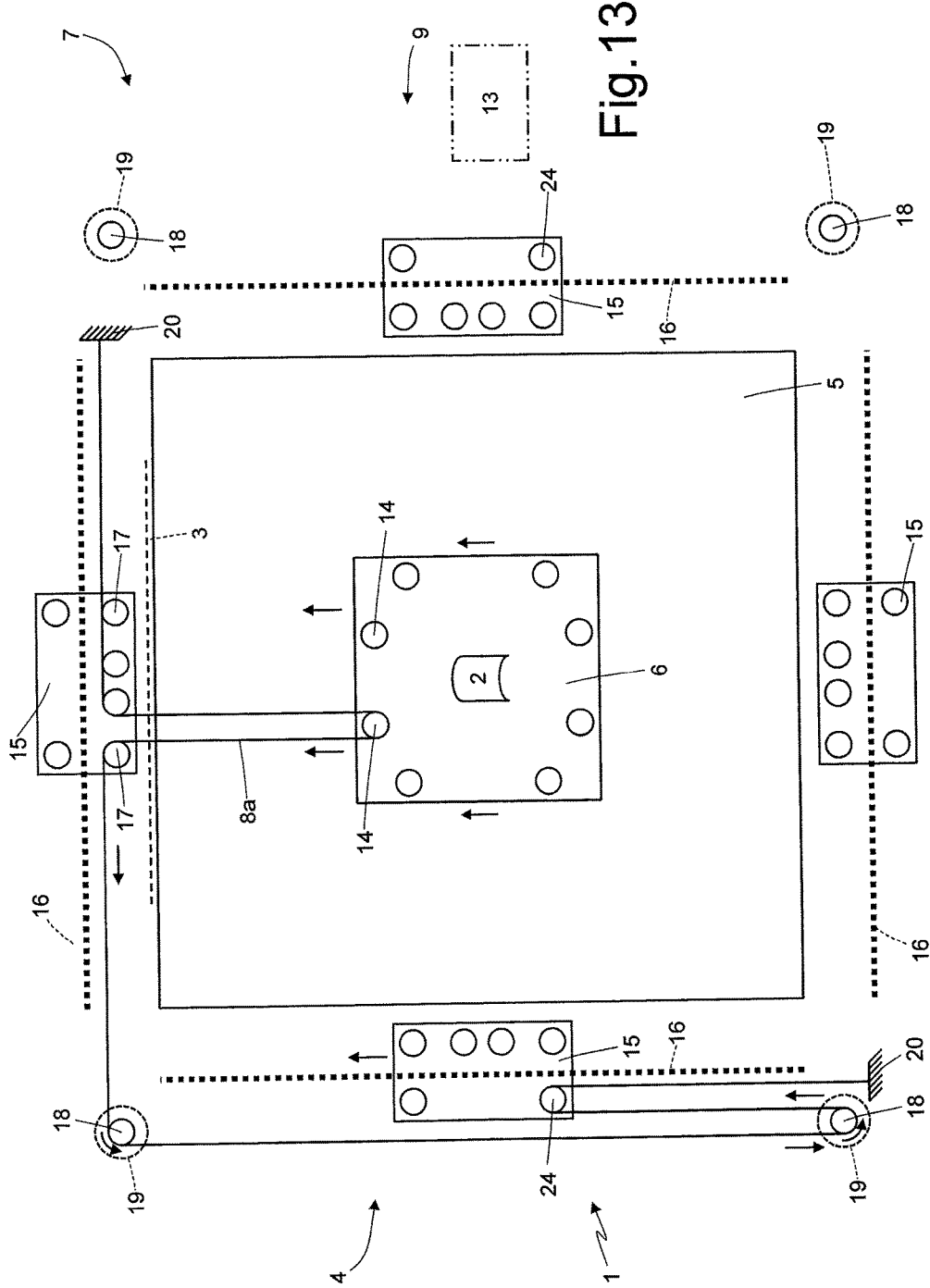
Figure 14:
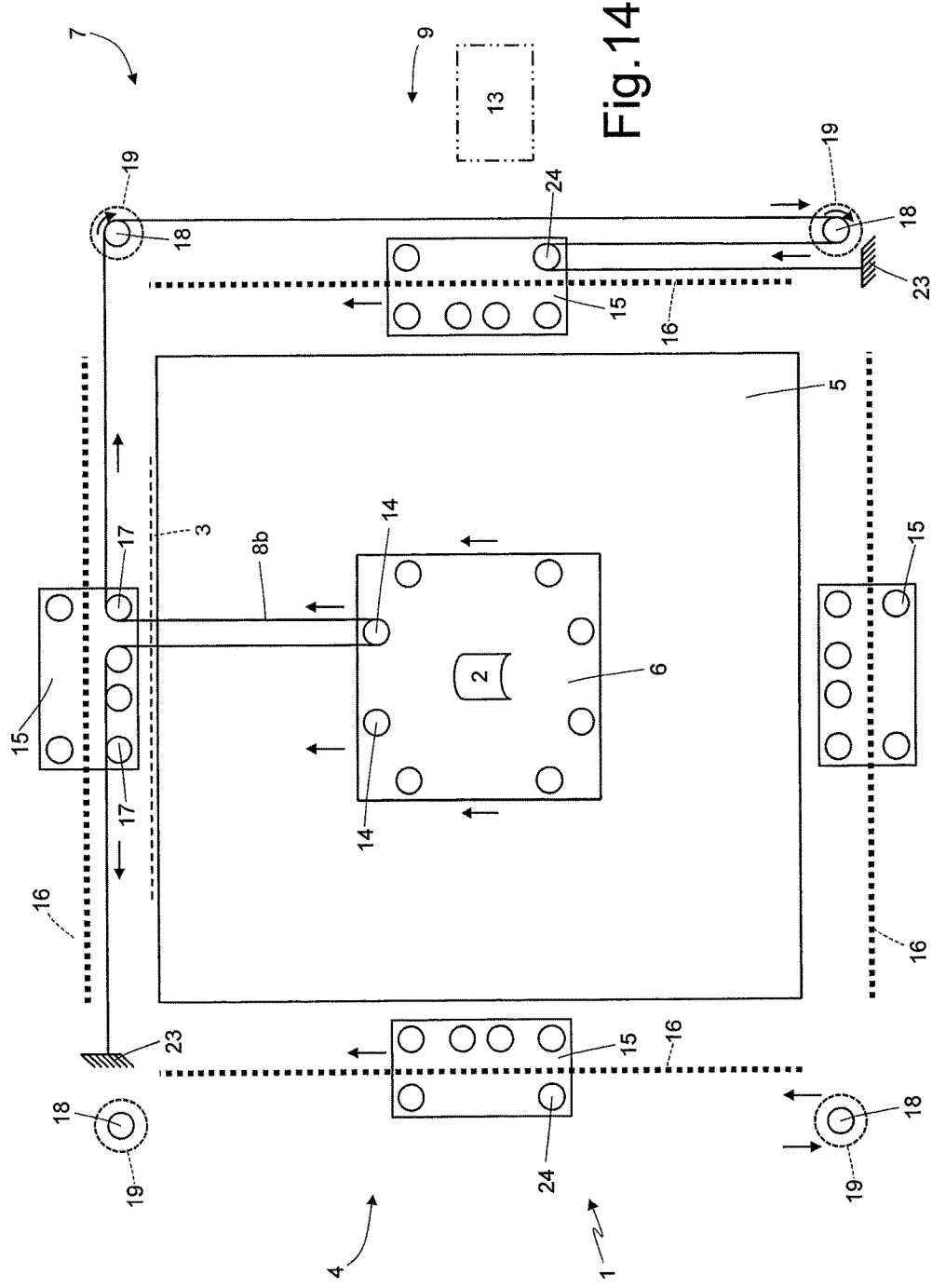

FIGS. 12, 13 and 14 show a variant of the moving system 4 shown in FIGS. 9, 10 and 11; FIG. 12 shows a single actuator device 7 of the moving system 4 (similar to the actuator device 7 shown in FIG. 8 and to the actuator device 7 shown in FIG. 4), which is provided with two flexible thread-like elements 8a and 8b (partially vertically arranged on top of one another), FIG. 13 shows the actuator device 7 of FIG. 12 only with the flexible thread-like element 8a (namely, without the flexible thread-like element 8b), and FIG. 14 shows the actuator device 7 of FIG. 12 only the flexible thread-like element 8b (namely, without the flexible thread-like element 8a).

In the moving system 4 shown in FIGS. 12, 13 and 14, each flexible thread-like element 8a and 8b is not constrained to the secondary slides 15 any longer, but it is constrained, on both sides, to the fixed frame by means of an anchorage 23. Therefore, each flexible thread-like element 8a and 8b is wound by 180° around a corresponding pulley 24, which is mounted as an idler pulley on a secondary slide 15, and, downstream of the pulley 24, is fitted into a corresponding anchorage 23; at the opposite end, relative to the secondary slide 15, each flexible thread-like element 8a and 8b is fitted into a corresponding anchorage 23. In other words, each flexible thread-like element 8a and 8b is constrained, at both ends, to the fixed frame by means of a pair of anchorages 23.

The moving system 4 shown in FIGS. 12, 13 and 14 permits an active control of the yaw movement of the mobile platform 6 (namely, of the rotation of the mobile platform 6 around a vertical rotation axis that is perpendicular to the fixed base 5). However this motion is limited as it requires the elongation of the flexible thread-like elements 8, which requires sustained motor torque.

Figure 15:
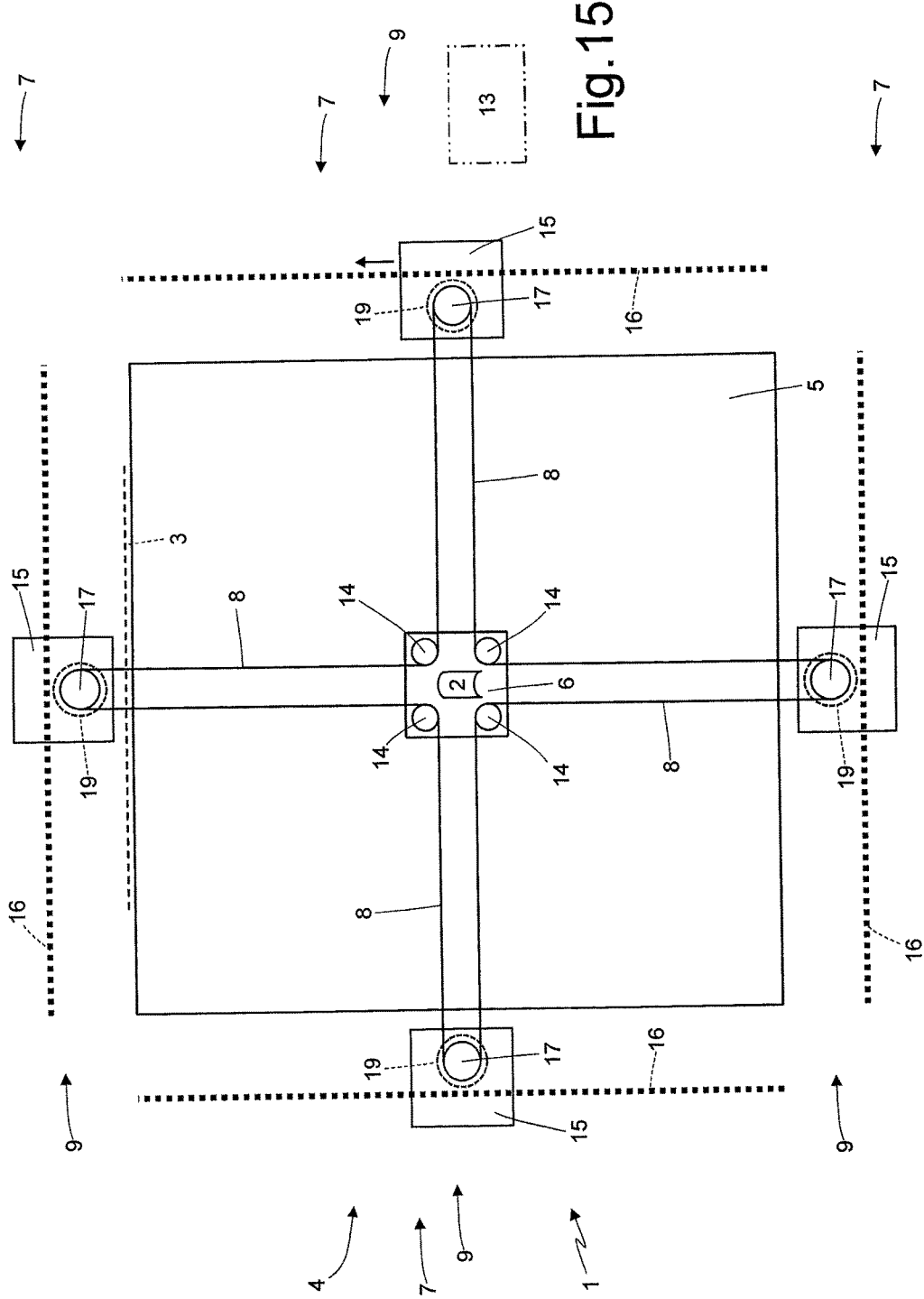
FIG. 15 is a schematic plan view of a further vehicle simulator according to the present invention.

FIG. 15 shows a further embodiment of the moving system 4, in which there is provided one single actuator device 7, which uses a single flexible thread-like element 8, which is closed on itself in a ring shape. Furthermore, there are provided four slides 15, which move along respective guides 16, and each slide supports a single pulley 17, which is motor-driven (namely coupled to an electric motor 19). The mobile platform 6 comprises four pulleys 14 and the flexible thread-like element 8 is wound by 90° (namely, is wound in an "L" shape) around each one of them. The embodiment shown in FIG. 15 is mechanically simple and has a small number of components, but, on the other hand, controlling the movement of the mobile platform 6 with precision is more complicated and the electric motors 19 are not stationary any longer, as they move together with the slides 15 (therefore, supplying power to the electric motors 19 is more difficult and the slides 15 also have to bear the weight of the relevant mass of the electric motors 19). However the length of the thread-like elements 8 between adjacent pulleys 18 (rotated by the electric motors 19) is shorter and therefore stiffer, which increases the controllability and bandwidth of the system. Also there are fewer free pulleys in the system (only the four pulleys 14), which can be subject to uncontrolled motion and resonance if subjected to an external disturbance, such as by Coulomb friction in their rotary bearings.

Figure 16:
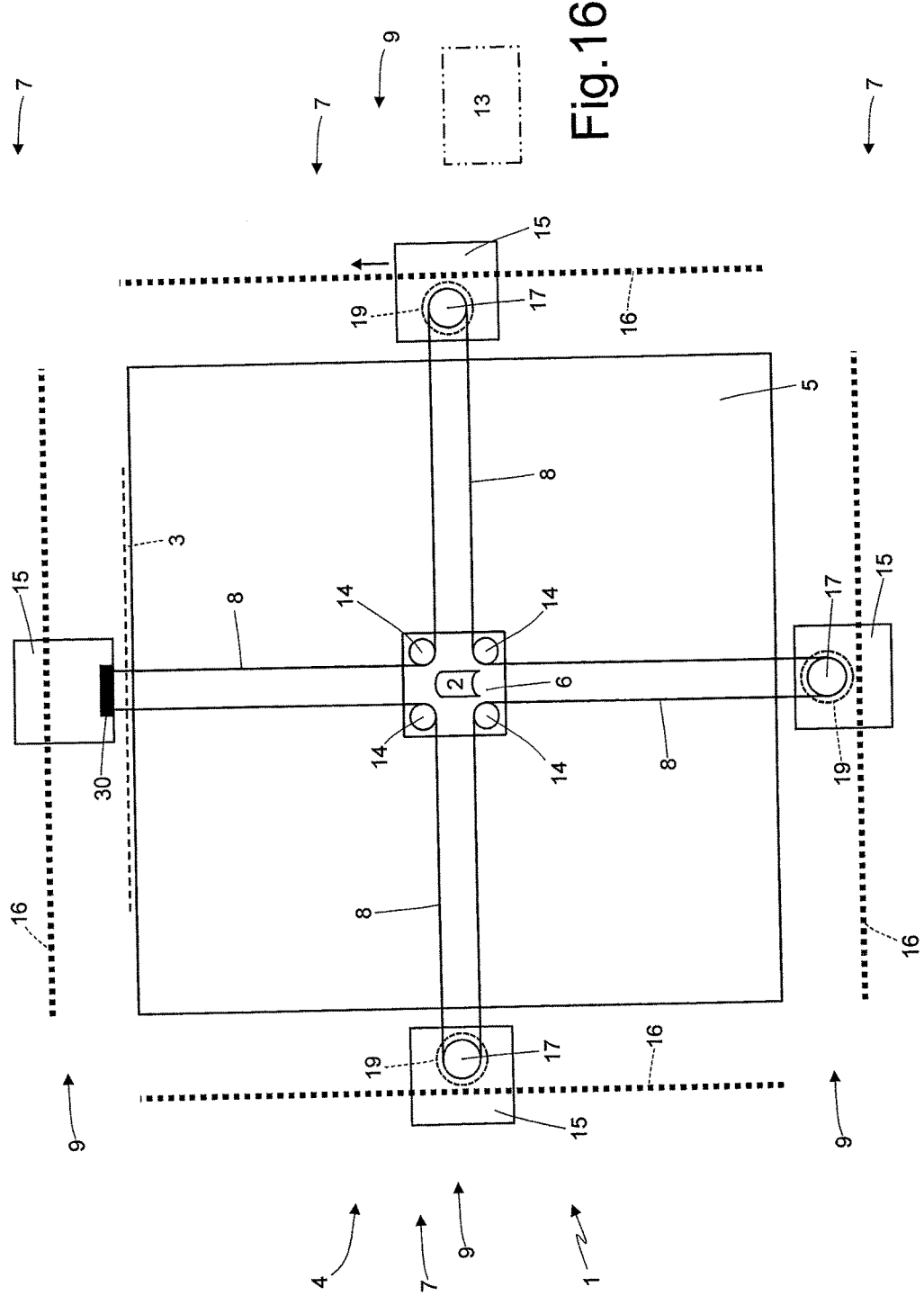
FIGS. 16, 17 and 18 are three schematic plan views of a corresponding variants of the vehicle simulator of FIG. 15.

FIG. 16 shows a possible variation of the FIG. 15 moving system 4, in which a pulley 17 is eliminated from a slide 15 and is substituted by an anchorage 30 to which two opposite ends of the thread-like element 8 are steadfastly connected to the slide 15.

In the embodiment shown in FIG. 15, there is one single flexible thread-like element 8, which is mechanically connected to the mobile platform 6 and is closed on itself in a ring shape. From a building point of view, manufacturers use one single flexible thread-like element 8 having a beginning and an end (i.e. an initial end and a final end), which are separate from one another and are joined (i.e. steadfastly connected to one another) after having coupled the flexible thread-like element 8 to the different pulleys 14, 17 and 18; however, the joining operation performed to give to the flexible thread-like element 8 the shape of a ring is particularly complicated, since the joint must be solid and, at the same time, flexible so as to be wound around the different pulleys 14, 17 and 18. On the contrary, the embodiment shown in FIG. 16 allows connecting the two ends of the thread-like element 8 to the anchorage 30 in a very simple manner and thus without requiring any flexible joint.

Figure 17:
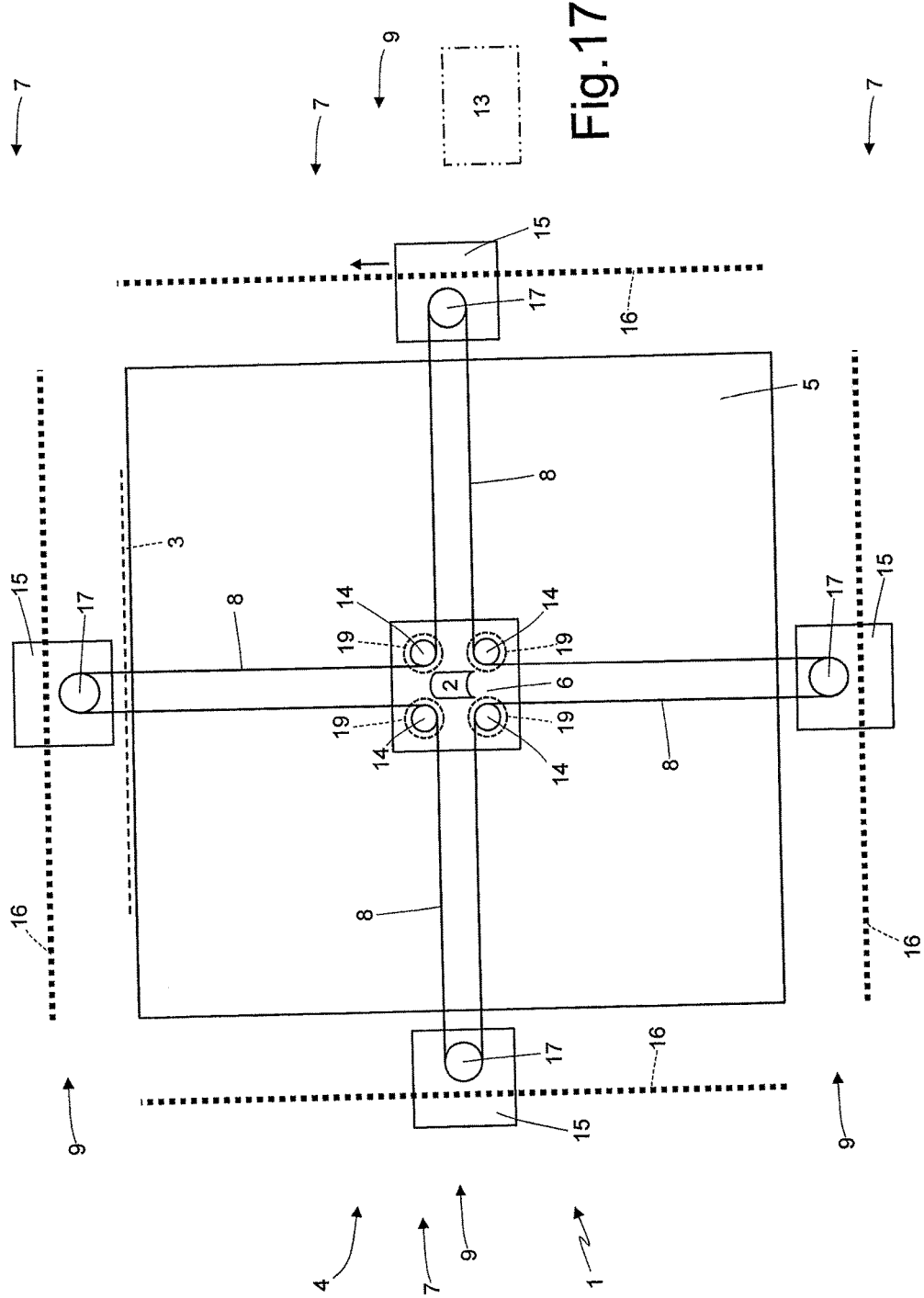
Figure 18:
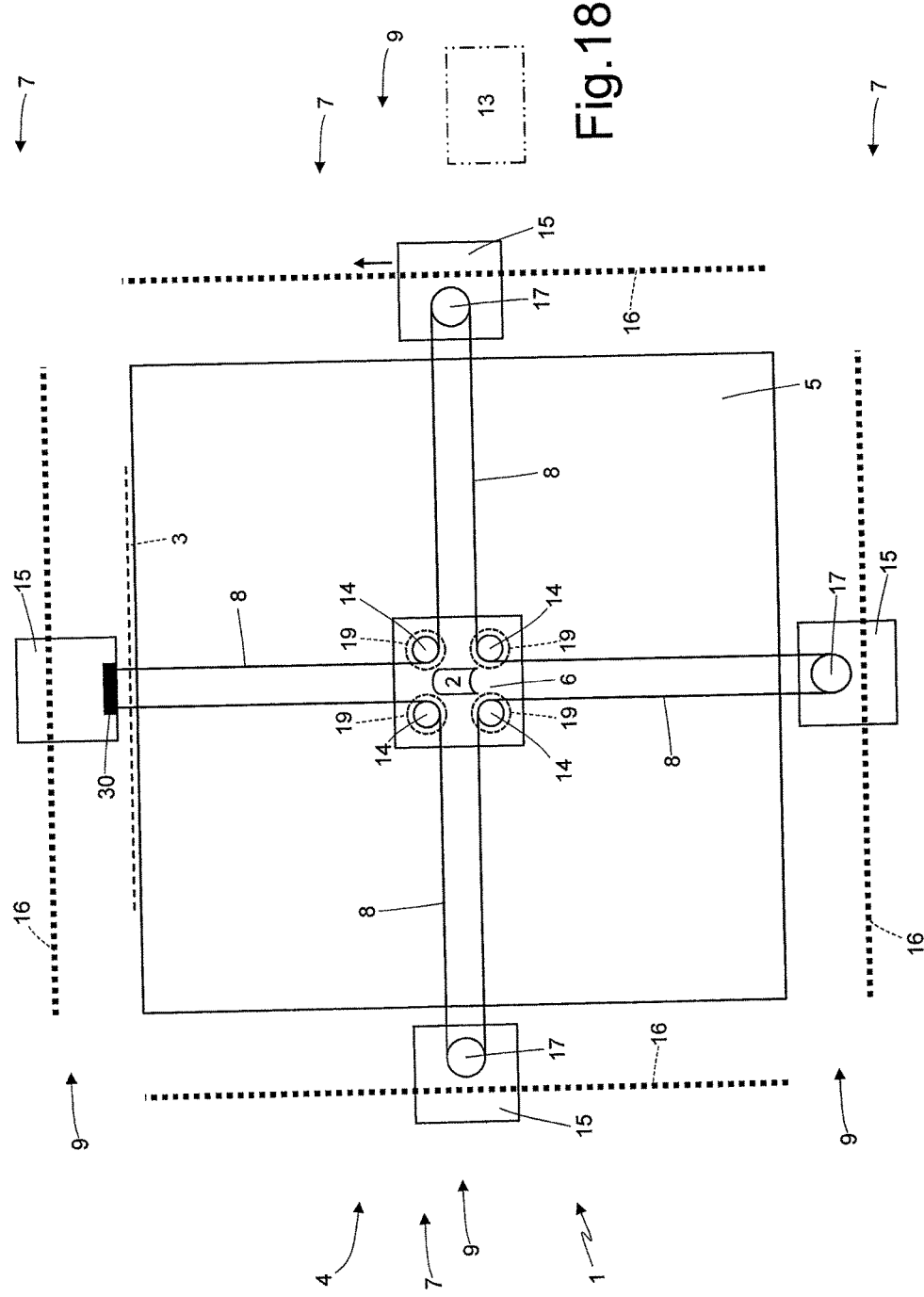

FIGS. 17 and 18 show two further variants of the embodiments respectively shown in FIGS. 15 and 16, in which the electric motors 19, instead of being coupled to the pulleys 17 mounted on the slides 15, are coupled to the pulleys 14 mounted on the mobile platform 6 (thus in this variants the pulleys 17 are idler mounted on the slides 15 and the pulleys 14 mounted on the mobile platform 6 are motorized).

The pilot's cabin 2 can be rigidly connected to the mobile platform 6; in particular, the pilot's cabin 2 can be directly connected to the mobile platform 6 without any elements interposed between them. In the embodiment in FIGS. 1 and 2 and, on a larger scale, in FIG. 19 (which can be indifferently applied to each one of the embodiments shown in the other figure), the vehicle simulator 1 comprises a secondary moving system 25, which is interposed between the mobile platform 6 and the pilot's cabin 2 and is suited to cause a relative movement between the mobile platform 6 and the pilot's cabin 2.

The moving system 4 indirectly applies to the pilot's cabin 2 (namely, the moving system 4 moves the mobile platform 6 supporting the pilot's cabin 2 through the interposition of the secondary moving system 25) movements that are relatively wide (namely, in the range of at least one meter and, preferably, some meters) and relatively progressive, i.e. gradually/slowly changing (namely, without any significant frequency content above 10-15 Hz); on the contrary, the secondary moving system 25 directly applies to the pilot's cabin 2 movements that are relatively small (namely, in the range of a few dozen centimeters) and relatively quick (namely, with frequency content of up to 200 Hz or even more). It is important to point out that the aforementioned frequency values are approximate and varies (even a lot) as a function of the size and stiffness of the system. In other words, it is technically impossible (or anyway way too expensive) to provide a single moving system that is able to apply to the pilot's cabin 2 (which, in use, weighs 200-300 kg) wide and quick movements; therefore, two moving systems 4 and 25 are used, which are arranged inside one another, so that the secondary moving system 25 ensures quick movements and the moving system 4 ensures wide movements.

The secondary moving system 25 comprises a hexapod 26, namely a Stewart platform. The hexapod comprises six legs 27, which are fixed to the mobile platform 6 and support a frame 28, which supports the pilot's cabin 2 (namely, the pilot's cabin 2 is directly fixed to the frame 28). In the embodiment shown in FIG. 19, each leg 27 has a lower end, which is hinged to the mobile platform 6 by means of a lower ball joint, and an upper end, which is hinged to the frame 28 by means of an upper ball joint. In the embodiment shown in FIGS. 1 and 2, each leg 27 has a lower end, which is hinged, by means of a lower ball joint, to a corresponding motor-driven slide, which slides along a ring guide that is integral to the mobile platform 6, and an upper end, which is hinged to the frame 28 by means of an upper ball joint. The hexapod 26 has six degrees of freedom: the frame 28 moves in direction x, y and z and rotates around three axes (roll, pitch, yaw). In order to control all six degrees of freedom in a completely independent manner, the hexapod 26 comprises six independent actuators, each coupled to a corresponding leg 27. Of course, other kind of movable platforms can be used instead of hexapods.

Figure 19:
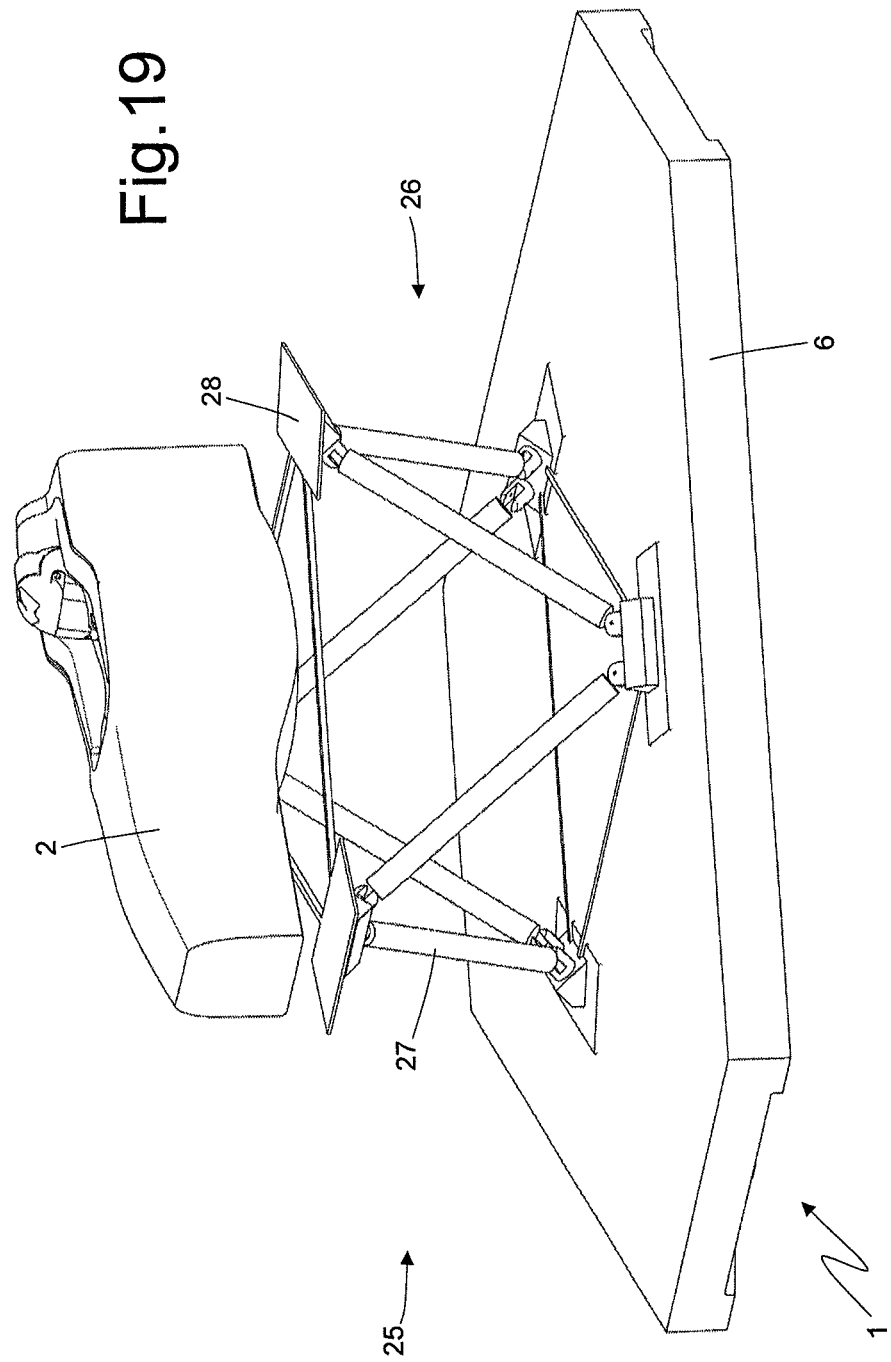
FIG. 19 is a schematic perspective view of a secondary moving system, which is interposed between a mobile platform and a pilot's cabin in the vehicle simulator according to the present invention.

In the embodiment shown in FIG. 19, the screen 3 can be mounted on the mobile platform 6 so that to be movable together with the mobile platform 6; in other words, the screen 3 is integral with the mobile platform 6, thus it moves when the mobile platform 6 moves by the action of the moving system 4. Consequently, the pilot's cabin 2 moves with respect of the screen 3 under the movements imparted to the pilot's cabin 2 by the secondary moving system 25.

Figure 20:
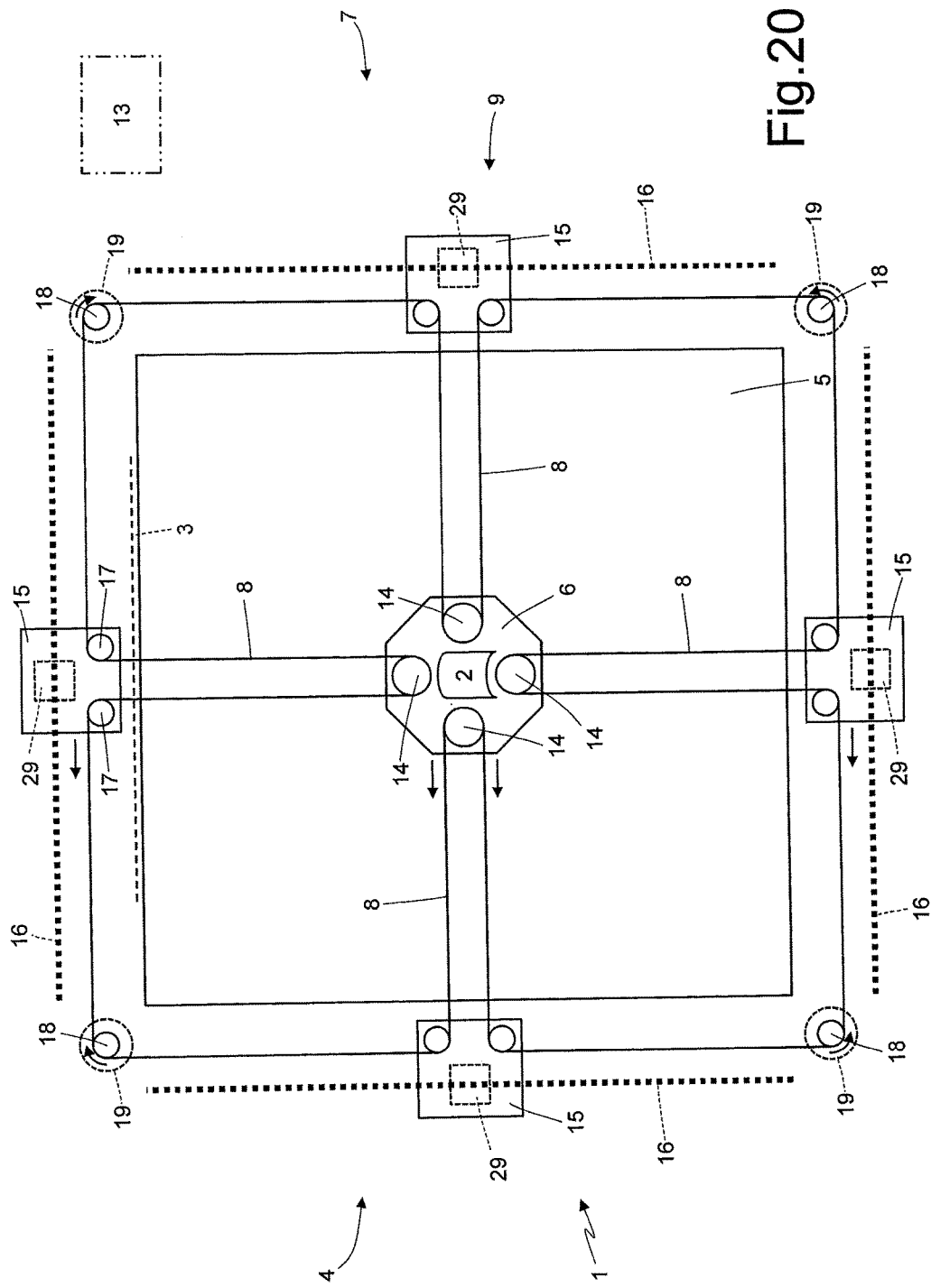
FIG. 20 is a schematic plan view of a further vehicle simulator according to the present invention.

In the embodiment shown in FIG. 20, the moving system 4 comprises one single actuator device 7, which is arranged on the outside of the mobile platform 6 and is mechanically connected to the mobile platform 6, so as to impart to the mobile platform 6 itself a movement relative to the fixed base 5. The actuator device 7 comprises one single flexible thread-like element 8, which is mechanically connected to the mobile platform 6 and is closed on itself in a ring shape (namely, an initial end of the flexible thread-like element 8 is joined to a final end of the flexible thread-like element 8, so that the flexible thread-like element 8 forms a continuous ring without interruptions). The actuator device 7 comprises a motorized mechanism 9, which is suited to apply a pulling force to the flexible thread-like element 8, so as to always keep the flexible thread-like element 8 pulled and, when needed, pull the mobile platform 6 towards an edge of the fixed base 5. Even in the embodiment shown in FIG. 20, the total free length of the flexible thread-like element 8 is always constant (apart from due to elastic extension and contraction due to changes in tension) and the moving system 4 has a constant geometry.

In the embodiment shown in FIG. 20, the motorized mechanism 9 comprises four pulleys 14, each mounted on the mobile platform 6 so as to be an idler pulley (meaning that it can freely rotate without any constraint) and having the flexible thread-like element 8 wound around it; in particular, the flexible thread-like element 8 is wound by 180° around each pulley 14, thus becoming "U"-shaped. The motorized mechanism 9 comprises four slides 15, each mounted so as to move along a corresponding straight guide 16, arranged in front of a corresponding pulley 14 of the mobile platform 6, and supporting two idler pulleys 17, which are mounted on the slide 15 itself and around which a corresponding side of the flexible thread-like element 8 is wound by 90°, so that the two sides of the flexible thread-like element 8 are deflected in opposite directions.

The motorized mechanism 9 comprises four pulleys 18 (winches/capstans), each interposed between two corresponding slides 15 and having the flexible thread-like element 8 wound around it by 90°. Each pulley 18 is motor-driven so as to rotate around its central axis due to the thrust of an electric motor 19.

Furthermore, the motorized mechanism 9 comprises four electric motors 29, each of which is coupled to a slide 15 and is suited to move the slide 15 along the corresponding straight guide 16; preferably (though not necessarily), the electric motors coupled to the slides 15 are linear electric motors.

The flexible thread-like element 8 is wound around each pulley 18 by 90°; alternatively, in order to have a better control on the part of the electric motor 19 (namely, in order to avoid an undesired slipping between the initial pulley 18 and the flexible thread-like element 8), the flexible thread-like element 8 could be wound around each pulley 18 by 450° (namely, 90°+360°) or by 810° (namely, 90°+360°+360°) or even more.

It should be pointed out that the single actuator device 7 comprises eight independent electric motors 19 and 29: the four electric motors 19 coupled to the pulleys 18 and the four electric motors 29 coupled to the slides 15. The presence of eight electric motors 19 and 29 allows the control unit 13 to have great freedom as to how to distribute the pulling forces applied by the flexible thread-like element 8 to the mobile platform 6 and, therefore, it allows the control unit 13 to apply to the mobile platform 6 the desired movement and, at the same time, to apply to the flexible thread-like element 8 a tension (namely, a pulling force) other than zero and always greater than the minimum value $T_{rope\_min}$.

The control unit 13 operates the four electric motors 19 so as to move the mobile platform 6 along the fixed base 5 and operates the four electric motors 29 so as to always keep all four slides 15 aligned with one another two by two and aligned relative to the mobile platform 6 (a condition that is not strictly necessary, but is preferable, as it simplifies the control of the moving system 4 and makes it more easily foreseeable). In other words, the four electric motors 19 of the four pulleys 18 are used to control the movement of the mobile platform 6 along the fixed base 5, whereas the four electric motors 29 of the four slides 15 are used to always keep all four slides 16 aligned with one another two by two and aligned relative to the mobile platform 6. For example, FIG. 20 shows the way in which the mobile platform 6 is moved to the left: the top left pulley 18 is caused to rotate in a clockwise direction, the top right pulley 18 is caused to rotate in a clockwise direction, the bottom right pulley 18 is caused to rotate in a counterclockwise direction, the bottom left pulley 18 is caused to rotate in a counterclockwise direction, the two slides 15 at the top and at the bottom are moved to the left to follow the movement of the mobile platform 6 and the two slides on the right and on the left remain still.

The embodiment shown in FIG. 20 has the same total number of electric motors (namely, eight electric motors overall) as the embodiments shown in FIGS. 1-14; therefore, from the point of view of the electric motors and of the complexity of control, the embodiment shown in FIG. 20 is substantially equivalent to the embodiments shown in FIGS. 1-14. However, the embodiment shown in FIG. 20 requires a much shorter total length of the flexible thread-like element 8 compared to the embodiments shown in FIGS. 1-14; the embodiment shown in FIG. 20 allows manufacturers to save approximately 60% of flexible thread-like element 8 compared to the embodiment shown in FIGS. 1-7 and the saving further increases compared to the embodiments shown in FIGS. 8-14.

In the embodiment shown in FIG. 20, there is one single flexible thread-like element 8, which is mechanically connected to the mobile platform 6 and is closed on itself in a ring shape. From a building point of view, manufacturers use one single flexible thread-like element 8 having a beginning and an end (i.e. an initial end and a final end), which are separate from one another and are joined (i.e. steadfastly connected to one another) after having coupled the flexible thread-like element 8 to the different pulleys 14, 17 and 18; however, the joining operation performed to give to the flexible thread-like element 8 the shape of a ring is particularly complicated, since the joint must be solid and, at the same time, flexible so as to be wound around the different pulleys 14, 17 and 18. In order to avoid having to join the two ends of the flexible thread-like element 8, the two embodiments shown in FIGS. 21 and 22 were developed, as they sacrifice perfect geometry in order to obtain an interruption in the continuity of the flexible thread-like element 8.

Figure 21:
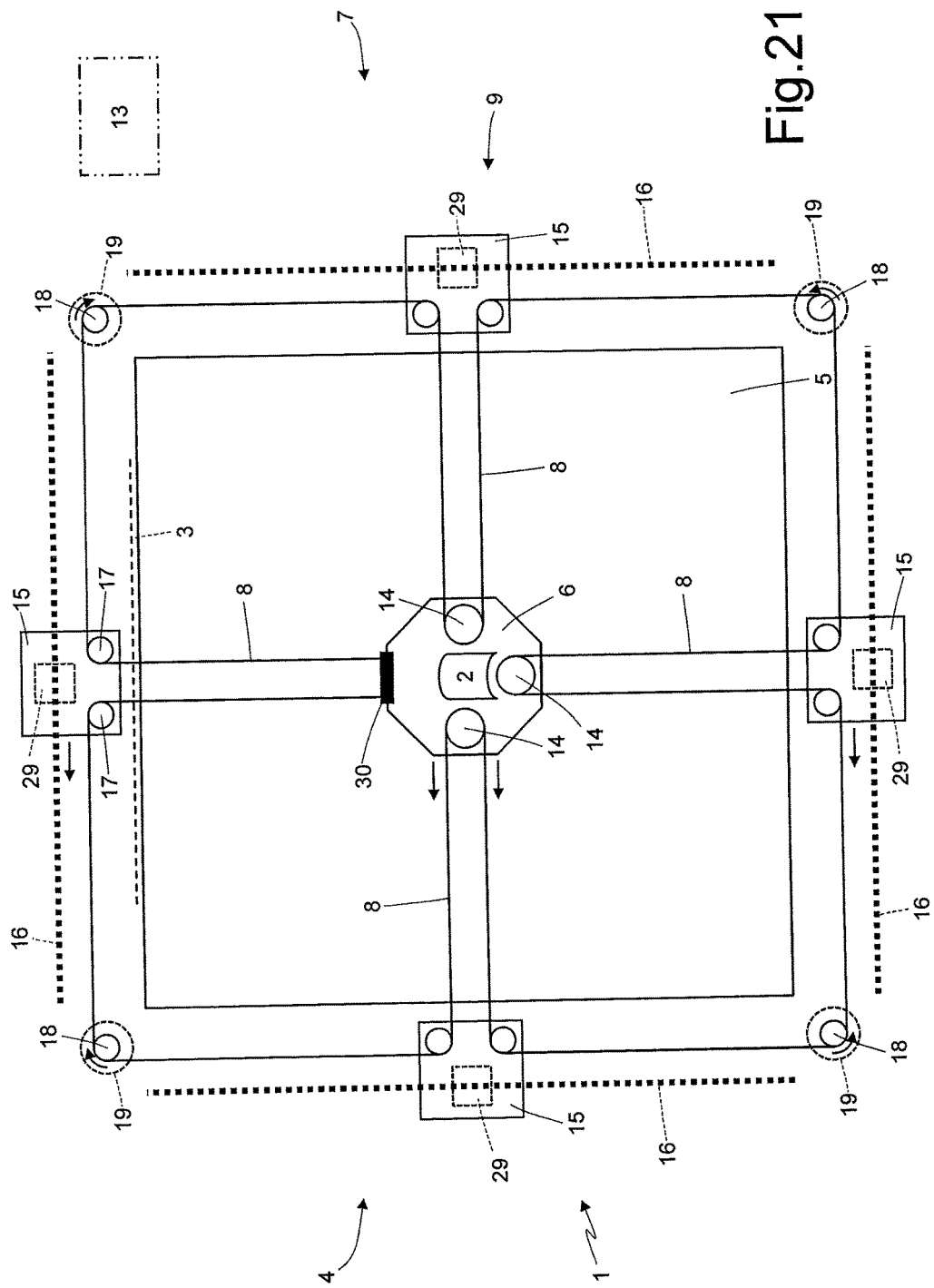
FIGS. 21 and 22 are two schematic plan views of the same number of variants of the vehicle simulator of FIG. 20.

In the embodiment shown in FIG. 21, a pulley 14 of the mobile platform 6 is removed and replaced with an anchorage 30, in which the two opposite ends of the flexible thread-like element 8 are steadfastly connected to the mobile platform 6.

Figure 22:
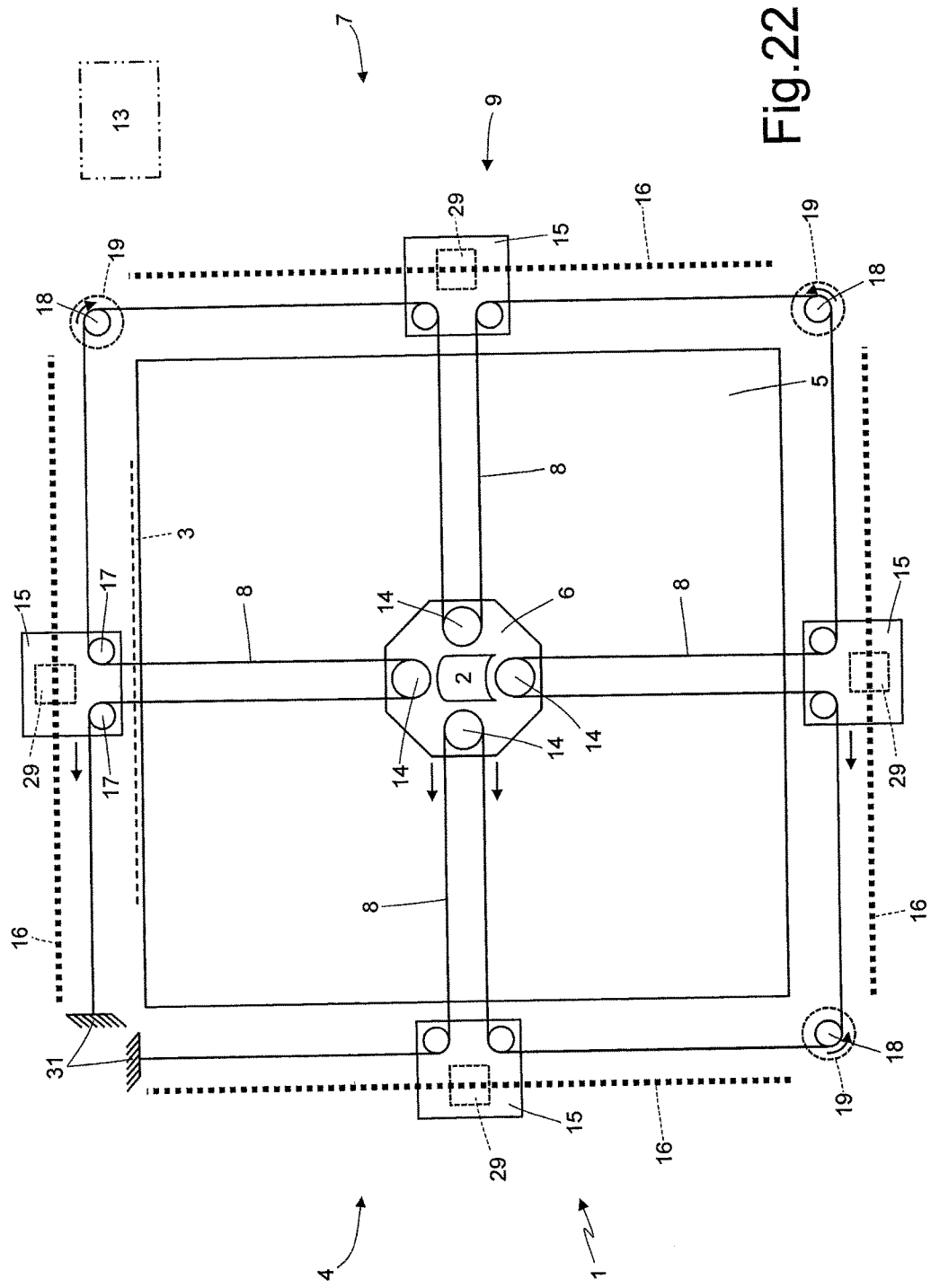
Figure 26:
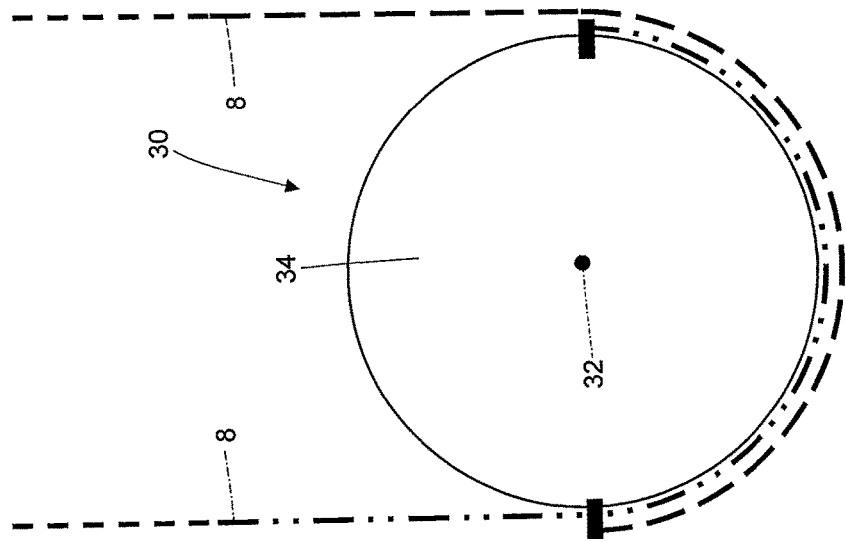
FIG. 26 is a schematic view of a variant of the anchorage roller of FIG. 25.

In the embodiment shown in FIG. 22, a pulley 18 (and, therefore, the corresponding electric motor 19) is removed and replaced with an anchorage 31, in which the two opposite ends of the flexible thread-like element 8 are steadfastly connected to the fixed frame.

The embodiments shown in FIGS. 20, 21 and 22 do not allow users to control the orientation of the mobile platform 6 on the fixed base (namely, the yaw angle of the mobile platform 6, i.e. the rotation of the mobile platform 6 around a vertical rotation axis that is perpendicular to the fixed base 5).

According to FIG. 23, the vehicle simulator 1 comprises a secondary moving system 25, which is interposed between the mobile platform 6 and the pilot's cabin 2 and is suited to generate a relative movement between the mobile platform 6 and the pilot's cabin 2 using the rotary movement of the pulleys 14. In particular, the secondary moving system 25 shown in FIG. 23 is suited to rotate the pilot's cabin 2 relative to the mobile platform 6 around a vertical rotation axis 32 that is perpendicular to the mobile platform 6 (and, therefore, to the fixed base 5). The secondary moving system 25 shown in FIG. 23 comprises a differential mechanism 33, which, on one side, supports the pilot's cabin 2 and, on the other side, is mechanically coupled to two pulleys 14 so as to receive a rotary motion 14 from the two pulleys 14: when the rotation speeds of the two pulleys 14 are identical, the pilot's cabin 2 remains still relative to the mobile platform 6 (namely, it does not rotate relative to the mobile platform 6 and around the rotation axis 32), whereas, when the rotation speeds of the two pulleys are different, the pilot's cabin 2 consequently rotates relative to the mobile platform 6 and around the rotation axis 32.

It should be pointed out that the secondary moving system 25 shown in FIG. 23 could be combined with the secondary moving system 25 shown in FIG. 19, so as to increase the possibilities of relative movement between the pilot's cabin 2 and the mobile platform 6.

FIGS. 24-29 show a further secondary moving system 25, which is coupled to the embodiment shown in FIG. 21 (wherein a pulley 14 of the mobile platform 6 is replaced with an anchorage 30, in which the two opposite ends of the flexible thread-like element 8 are steadfastly connected to the mobile platform 6). The secondary moving system 25 shown in FIGS. 24-29 comprises an actuator roller 34, which is hinged to the mobile platform 6, so as to rotate relative to the mobile platform 6 itself around the rotation axis 32, and makes up the anchorage 30 of the flexible thread-like element 8 (namely, the two ends of the flexible thread-like element 8 are steadfastly constrained to the actuator roller 34). The secondary moving system 25 shown in FIGS. 24-29 comprises, furthermore, a rotary support 35, which supports the pilot's cabin 2, is hinged to the mobile platform 6, so as to rotate relative to the mobile platform 6 itself around the rotation axis 32, and is angularly integral to the actuator roller 34 by means of a transmission shaft 36. Due to the movement of the two ends of the flexible thread-like element 8, which are integral to the actuator roller 34, the actuator roller 34 is caused to rotate around the rotation axis 32 and, therefore, the rotary support 35 is caused to rotate in the same way.

According to a possible embodiment, the actuator roller 34 can also integrate a mechanical puller of the flexible thread-like element 8: the anchorage 30 of the flexible thread-like element 8 can be movable about the rotation axis 32 (i.e. can slide with respect of the lateral surface of the actuator roller 34) to increase or to reduce the pretension of the flexible thread-like element 8.

Figure 25:
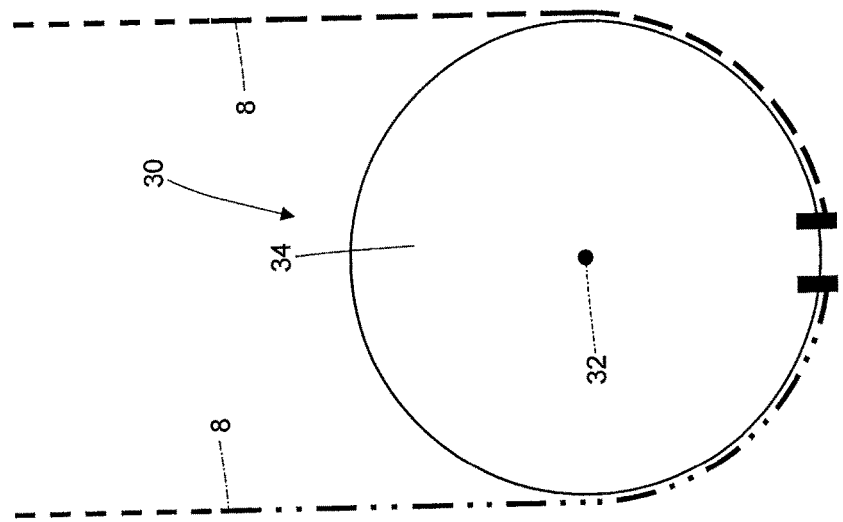
FIG. 25 is a schematic view of an anchorage roller of a mobile platform of the vehicle simulator of FIG. 24.

According to FIG. 25, each end of the flexible thread-like element 8 is wound around the actuator roller 34 by approximately 90°; in this embodiment, the actuator roller 34 can be caused to rotate around the rotation axis 32 with an angular range of approximately ±90°. According to FIG. 26, each end of the flexible thread-like element 8 is wound around the actuator roller 34 by approximately 180° (obviously, the two ends of the flexible thread-like element 8 are vertically offset, meaning that they arranged at different heights); in this embodiment, the actuator roller 34 can be caused to rotate around the rotation axis 32 with an angular range of approximately ±180°.

It should be pointed out that the secondary moving system 25 shown in FIGS. 24-29 could be combined with the secondary moving system 25 shown in FIG. 19, so as to increase the possibilities of relative movement between the pilot's cabin 2 and the mobile platform 6.

Figure 31:
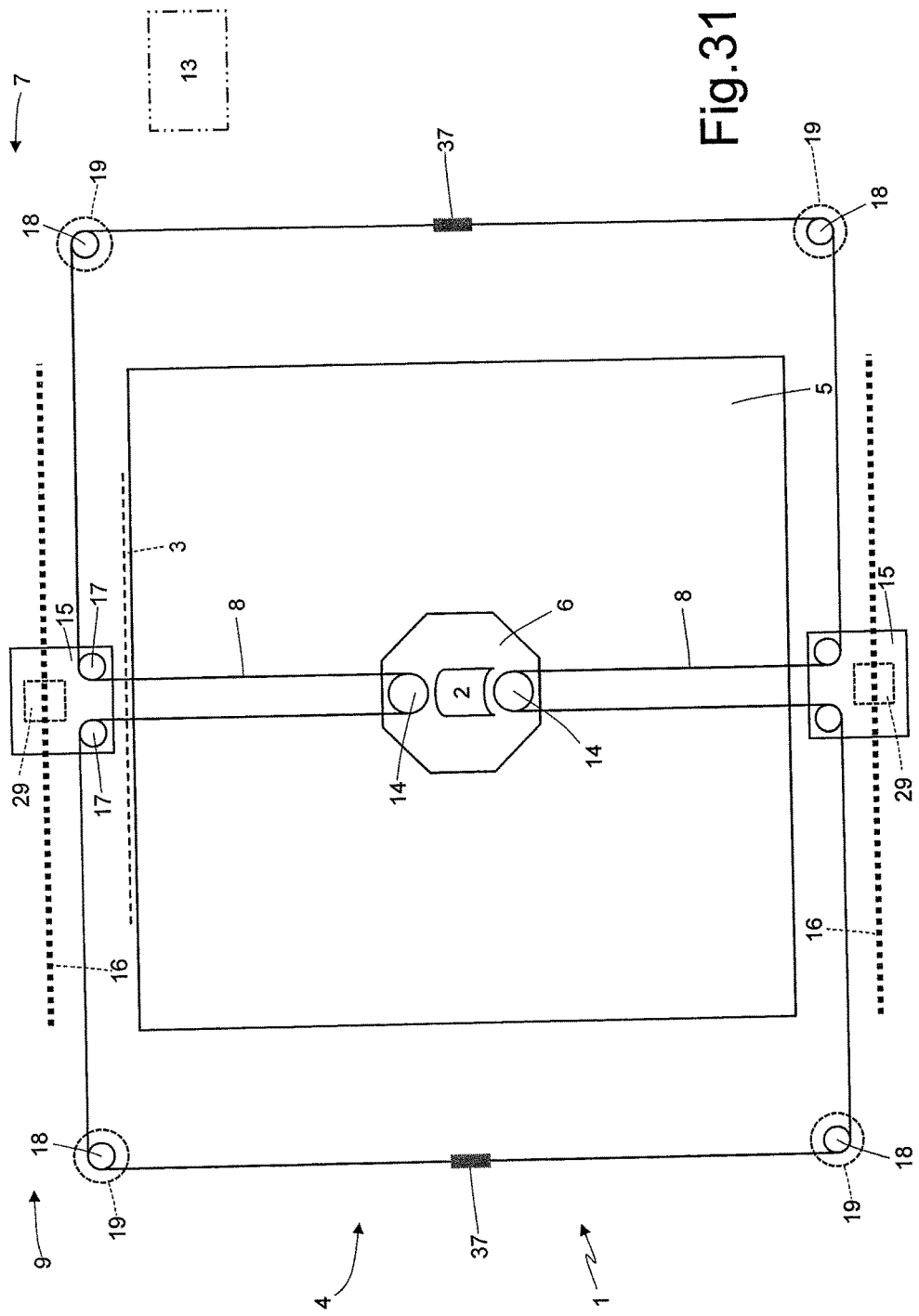
FIGS. 31 and 32 are two schematic plan views of corresponding actuator devices of the vehicle simulator of FIG. 30.
Figure 32:
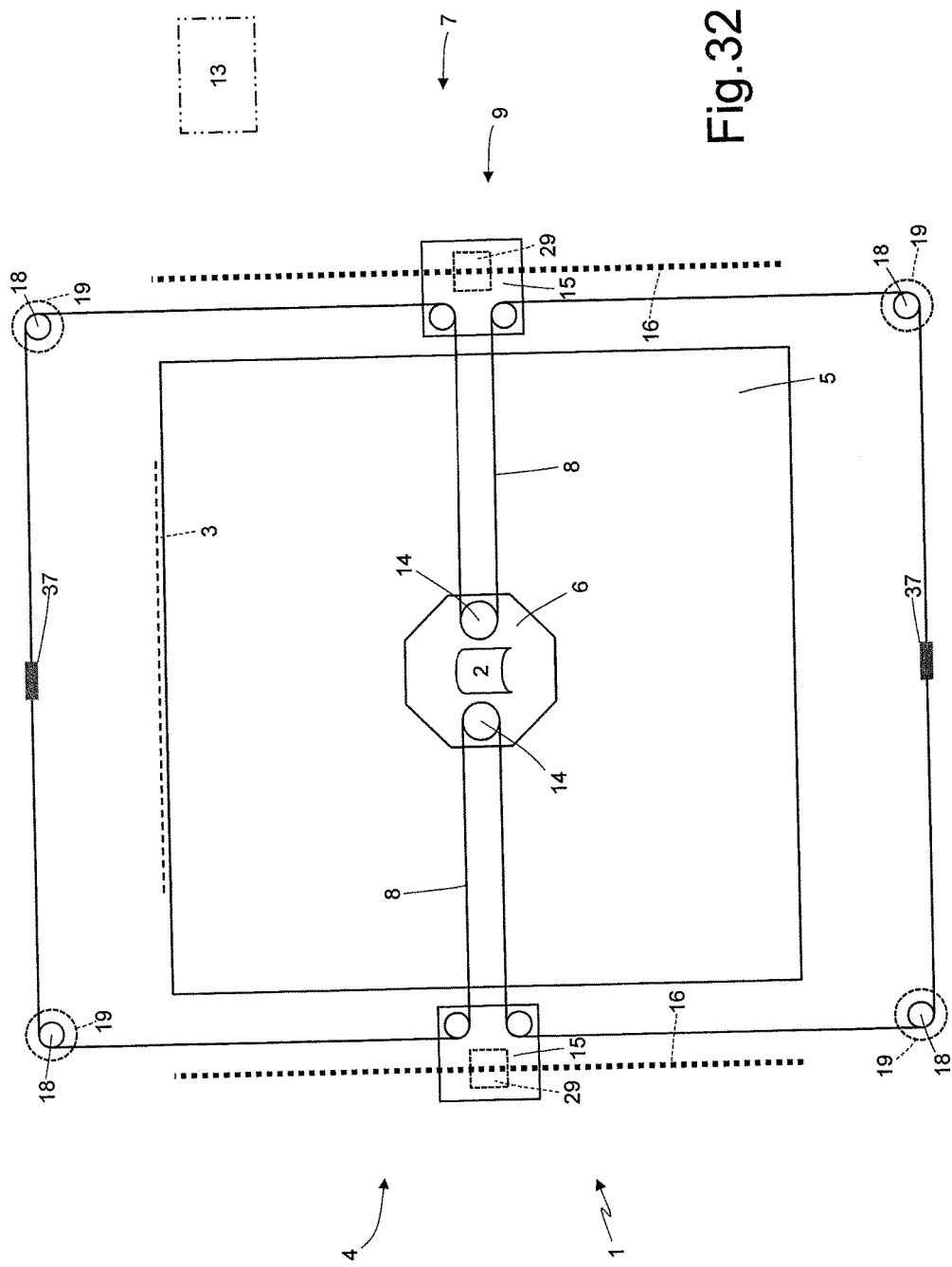

In the embodiment shown in FIG. 30, the moving system 4 is halfway between the moving system 4 shown in FIGS. 1-6 and the moving system 4 shown in FIG. 20. The moving system 4 shown in FIG. 30 comprises two actuator devices (separately shown in FIGS. 31 and 32, respectively), each arranged on the outside of the mobile platform 6 and mechanically connected to the mobile platform 6, so as to impart to the mobile platform 6 itself a movement relative to the fixed base 5. Each actuator device 7 comprises a flexible thread-like element 8, which is mechanically connected to the mobile platform 6 and is closed on itself in a ring shape (namely, an initial end of the flexible thread-like element 8 is joined to a final end of the flexible thread-like element 8, so that the flexible thread-like element 8 forms a continuous ring without interruptions). Each actuator device 7 comprises a motorized mechanism 9, which is suited to apply a pulling force to the flexible thread-like element 8, so as to always keep the flexible thread-like element 8 pulled and, when needed, pull the mobile platform 6 towards an edge of the fixed base 5. Even in the embodiment shown in FIG. 30, the total free length of the flexible thread-like element 8 is always constant (apart from due to elastic extension and contraction due to changes in tension) and the moving system 4 has a constant geometry.

In the embodiment shown in FIG. 30, each motorized mechanism 9 comprises two pulleys 14, each mounted on the mobile platform 6 so as to be an idler pulley (meaning that it can freely rotate without any constraint) and having the flexible thread-like element 8 wound around it; in particular, the flexible thread-like element 8 is wound by 180° around each pulley 14, thus becoming "U"-shaped. Each motorized mechanism 9 comprises two slides 15, each mounted so as to move along a corresponding straight guide 16, arranged in front of a corresponding pulley 14 of the mobile platform 6, and supporting two idler pulleys 17, which are mounted on the slide 15 itself and around which a corresponding side of the flexible thread-like element 8 is wound by 90°, so that the two sides of the flexible thread-like element 8 are deflected in opposite directions.

Each motorized mechanism 9 comprises four pulleys 18 (winches/capstans), each interposed between two corresponding slides 15 and having the flexible thread-like element 8 wound around it by 90°. Each pulley 18 is motor-driven so as to rotate around its central axis due to the thrust of an electric motor 19.

Furthermore, each motorized mechanism 9 comprises two electric motors 29, each of which is coupled to a slide 15 and is suited to move the slide 15 along the corresponding straight guide 16; preferably (though not necessarily), the electric motors coupled to the slides 15 are linear electric motors.

The flexible thread-like element 8 is wound around each pulley 18 by 90°; alternatively, in order to have a better control on the part of the electric motor 19 (namely, in order to avoid an undesired slipping between the initial pulley 18 and the flexible thread-like element 8), the flexible thread-like element 8 could be wound around each pulley 18 by 450° (namely, 90°+360°) or by 810° (namely, 90°+360°+360°) or even more.

It should be pointed out that the two actuator devices 7 totally comprise twelve independent electric motors 19 and 29: the eight electric motors 19 coupled to the pulleys 18 and the four electric motors 29 coupled to the slides 15. The presence of twelve electric motors 19 and 29 allows the control unit 13 to have great freedom as to how to distribute the pulling forces applied by the flexible thread-like element 8 to the mobile platform 6 and, therefore, it allows the control unit 13 to apply to the mobile platform 6 the desired movement and, at the same time, to apply to the flexible thread-like element 8 a tension (namely, a pulling force) other than zero and always greater than the minimum value $T_{rope\_min}$.

The control unit 13 operates the eight electric motors 19 so as to move the mobile platform 6 along the fixed base 5 and operates the four electric motors 29 so as to always keep all four slides 15 aligned with one another two by two and aligned relative to the mobile platform 6 (a condition that is not strictly necessary, but is preferable, as it simplifies the control of the moving system 4 and makes it more easily foreseeable). In other words, the eight electric motors 19 of the eight pulleys 18 are used to control the movement of the mobile platform 6 along the fixed base 5, whereas the four electric motors 29 of the four slides 15 are used to always keep all four slides 16 aligned with one another two by two and aligned relative to the mobile platform 6. In particular, an actuator device 7 (shown in FIG. 31) is used to move the mobile platform 6 upwards or downwards, whereas the other actuator device 7 (shown in FIG. 32) is used to move the mobile platform 6 to the right or to the left.

The embodiment shown in FIG. 30 has a greater total number of electric motors (namely, twelve electric motors overall) compared to embodiments shown in FIGS. 1-29; therefore, from the point of view of the electric motors, the embodiment shown in FIG. 30 is at a disadvantage relative to the embodiments shown in FIGS. 1-29. However, the embodiment shown in FIG. 30 requires a shorter total length of the flexible thread-like element 8 compared to the embodiments shown in FIGS. 1-14; the embodiment shown in FIG. 30 allows manufacturers to save approximately 40% of flexible thread-like element 8 compared to the embodiment shown in FIGS. 1-7 and the saving further increases compared to the embodiments shown in FIGS. 8-14. On the other hand, the embodiment shown in FIG. 30 requires a total length of the flexible thread-like element 8 that is greater (by approximately 50%) compared to the embodiments shown in FIGS. 20-29.

In the embodiment shown in FIG. 30, a rigid joint 37 of the flexible thread-like element 8 can be placed in correspondence to the long branches where there are no slides 15; the rigid joints 37 cannot deform to be wound around the pulleys 18 (hence, they can be manufactured in a simple and relatively low-cost manner), as, in use, they never come into contact with the pulleys 18. In other words, the embodiment shown in FIG. 30 is perfectly symmetrical and, at the same time, it does not require the presence of flexible joints of the flexible thread-like element 8 (namely, joints that can be wound around the pulleys 18). According to a possible embodiment, in correspondence of the rigid joints 37 are arranged mechanical pullers (which pretensions the flexible thread-like element 8.

Figure 33:
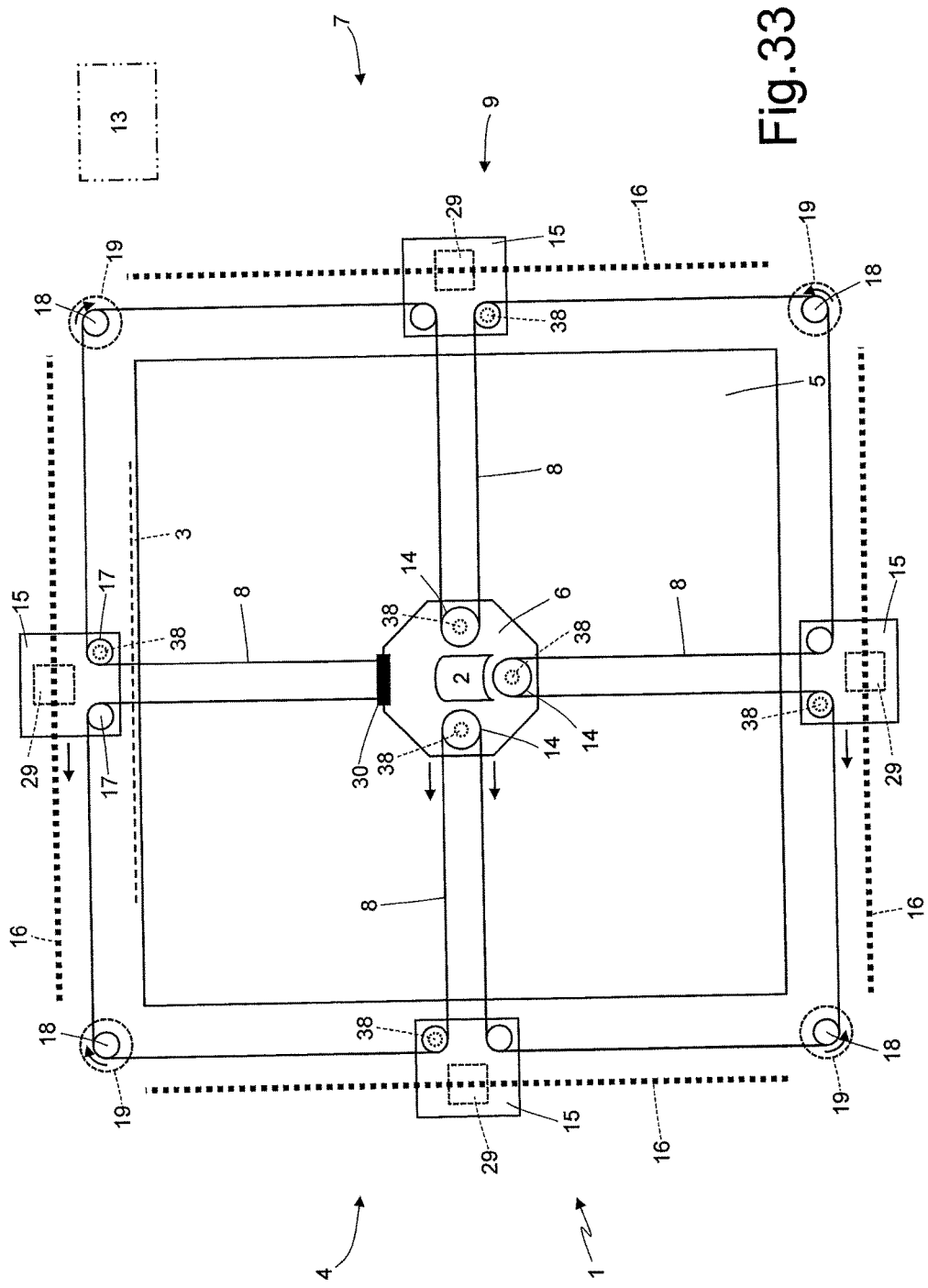
FIGS. 33 and 34 are two schematic plan views of a corresponding variants of the vehicle simulator of FIG. 20.

FIG. 33 shows a variation of the embodiment shown in FIG. 20, in which at least some of the idler pulleys 14 and 17 are coupled to a comparatively small damping electric motor 38 (with very low torque capability in comparison to the electric motors 19 of the pulley 18) to apply a controlled torque to damp out and reduce the effect of any disturbances imparted onto the free idler pulleys 14 and 17 by external forces. Such disturbances or external forces may arise from Coulomb friction in the bearings of the pulleys 14 and 17, or excitation resulting from an unwanted disturbing motion or force applied at the mobile platform 6. Obviously, at least one damping electric motor 38 can be coupled to the idler pulleys 14, 17 and 18 of any of the moving systems 4 described above.

Figure 34:
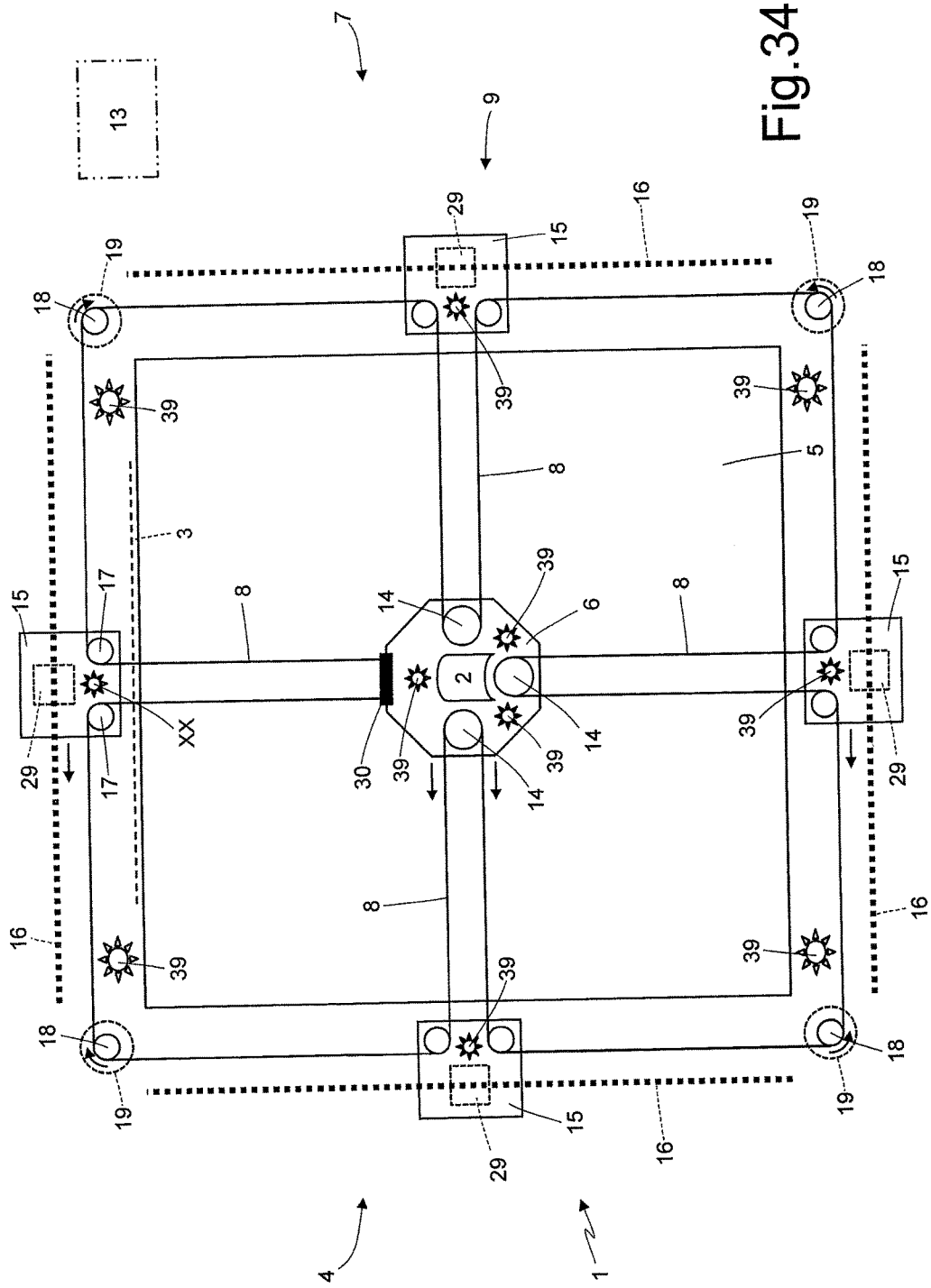

FIG. 34 shows a variation of the embodiment shown in FIG. 20, in which are provided mechanical (i.e. passive) or electrical (i.e. active having an electronic control) damping devices 39 that can damp out any unwanted transverse resonances in the flexible thread-like elements 8. The damping devices 39 can sit on the slides 15 and apply a damping action to any resonant motion perpendicular to the length of the flexible thread-like elements 8 running to the mobile platform 6. Similarly, the damping devices 39 can sit on the mobile platform 6 and apply a damping action to any resonant motion perpendicular to the length of the flexible thread-like elements running to the slide 15. Further damping devices 39 could be mounted in a stationary position relative to the fixed base 5 and damp out any resonant motion perpendicular to the length of the flexible thread-like elements 8 running between the motorised pulleys 18. Obviously, at least one damping device 39 can be coupled to any of the moving systems 4 described above.

The vehicle simulator 1 described above has numerous advantages.

First of all, the moving system 4 of the vehicle simulator 1 described above, in its different embodiments, is able to impart to the mobile platform 6 supporting the pilot's cabin 2 particularly quick and wide movements.

Furthermore, the moving system 4 of the vehicle simulator 1 described above, in its different embodiments, is able to control the law of motion of the mobile platform 6 supporting the pilot's cabin 2 in a precise manner, thus allowing it to closely follow the desired law of motion.

Finally, the moving system 4 of the vehicle simulator 1 described above, in its different embodiments, is relatively simple and cheap, since it uses components (ropes/belts, slides, pulleys, rotary electric motors) that can easily be purchased from different suppliers available in the market. The moving system 4 is relatively lightweight because, unlike most other driving simulator motion platforms, it does have to transmit bending loads, or resist buckling forces, which require heave structures. Instead all the forces are transmitted by tension which only requires lightweight flexible threadlike elements, which results in light weight actuators, providing good controllability and bandwidth.

Obviously, the vehicle simulator 1 described above finds advantageous application in the simulation of any road vehicle (for example a car or a motorcycle), watercraft (for example a race speedboat) or aircraft (for example an airplane, a helicopter or a spaceship).

What is claimed is:

1. A vehicle simulator comprising: a pilot's cabin which is suited to accommodate at least one pilot of the vehicle, at least one screen which is arranged in front of the pilot's cabin, and a moving system which supports the pilot's cabin and is suited to move the pilot's cabin in the space;

wherein the moving system comprises:

a fixed base arranged horizontally;

a mobile platform, which supports the pilot's cabin and rests on the fixed base so as to freely slide on the fixed base; and at least one actuator device, which is mechanically connected to the mobile platform so as to impart to the mobile platform a movement relative to the fixed base;

wherein the actuator device comprises:

at least one flexible thread-like element, which is mechanically connected to the mobile platform; and a motorized mechanism, which always keeps the total free length of the flexible thread-like element constant and is suited to apply a pulling force to the flexible thread-like element, so as to always keep the flexible thread-like element in tension and, when needed, pull the mobile platform towards an edge of the fixed base;

wherein the motorized mechanism comprises:

at least one first pulley mounted on the mobile platform and around which the flexible thread-like element is wound;

at least one straight guide arranged in front of the first pulley of the mobile platform; and a slide, which is mounted so as to move along the straight guide and supports at least one second pulley, which is mounted on the slide and around which the flexible thread-like element is wound.

2. The vehicle simulator according to claim 1, wherein the first pulley is mounted on the mobile platform as an idler pulley.

3. The vehicle simulator according to claim 1, wherein the first pulley is an idler pulley and around which the flexible thread-like element is wound by 180°, thus assuming, in the area of the mobile platform, a "U" shape.

4. The vehicle simulator according to claim 3, wherein the first slide supports two second pulleys, which are mounted on the slide as idler pulleys and around which a corresponding side of the flexible thread-like element is wound by 90°, so that that the two sides of the flexible thread-like element are deflected in opposite directions.

5. The vehicle simulator according to claim 4, wherein the motorized mechanism comprises:
  two second slides, each of which is arranged on one side of the first slide, is coupled to a corresponding second pulley, is mounted so as to slide along a corresponding second straight guide, and is fixed to an end of the flexible thread-like element; and
  at least two third pulleys, each of which is interposed between the first slide and a corresponding second slide, is preferably motor-driven so as to rotate around its central axis due to the thrust of an electric motor, and has the flexible thread-like element wound around it by 90°.

6. The vehicle simulator according to claim 5, wherein the motorized mechanism comprises two fourth pulleys, each of which is interposed between a corresponding third pulley, is preferably motor-driven so as to rotate around its central axis due to the thrust of an electric motor,
  and a corresponding second slide and has the flexible thread-like element wound around it by 180°.

7. The vehicle simulator according to claim 5, wherein the motorized mechanism comprises two motors, each of which is coupled to a second slide and is suited to move the second slide along the corresponding second straight guide.

8. The vehicle simulator according to claim 1, wherein the moving system comprises one single actuator device comprising, in turn:
  a single flexible thread-like element, which is closed on itself in a ring shape; and
  a motorized mechanism comprising at least three first pulleys, each mounted on the mobile platform and having the flexible thread-like element wound around it; and four slides, which slide along respective straight guides and each support at least one second pulley, around which the flexible thread-like element is wound.

9. The vehicle simulator according to claim 8, wherein the motorized mechanism comprising four first pulleys, each mounted on the mobile platform and having the flexible thread-like element wound around it by 90°, and four slides, which slide along respective straight guides and each support one single second pulley, around which the flexible thread-like element is wound by 180°.

10. The vehicle simulator according to claim 8, wherein the motorized mechanism comprising four first pulleys, each mounted on the mobile platform and having the flexible thread-like element wound around it by 90°, three slides, which slide along respective straight guides and each support one single second pulley, around which the flexible thread-like element is wound by 180°, and one slide, which slide along a respective straight guide and supports an anchorage of two opposite ends of the flexible thread-like element.

11. The vehicle simulator according to claim 8, wherein the motorized mechanism comprising at least three first pulleys, each mounted on the mobile platform so as to be an idler pulley and having the flexible thread-like element wound around it by 180°, and at least three, preferably four, slides, which slide along respective straight guides and each support two second pulleys, which are mounted as idler pulleys and around which a corresponding side of the flexible thread-like element is wound by 90°, so that that the two sides of the flexible thread-like element are deflected in opposite directions.

12. The vehicle simulator according to claim 11, wherein the motorized mechanism comprises at least three, preferably four, motors, each of which is coupled to a slide and is suited to move the slide along the corresponding straight guide.

13. The vehicle simulator according to claim 11, wherein the motorized mechanism comprises at least three third pulleys, each interposed between two slides and having the flexible thread-like element wound around it by 90°.

14. The vehicle simulator according to claim 13, wherein the motorized mechanism comprises four third pulleys, each interposed between two slides and having the flexible thread-like element wound around it by 90°.

15. The vehicle simulator according to claim 13, wherein the motorized mechanism only comprises three third pulleys and, between two slides, two opposite ends of the flexible thread-like element are fixed to the frame by means of an anchorage.

16. The vehicle simulator according to claim 13, wherein each third pulley is motor-driven so as to rotate around its central axis of its due to the thrust of an electric motor.

17. The vehicle simulator according to claim 11, wherein the motorized mechanism comprises four first pulleys.

18. The vehicle simulator according to claim 11, wherein the motorized mechanism only comprises three first pulleys and, on a same side without a first pulley, two opposite ends of the flexible thread-like element are fixed to the mobile platform by means of an anchorage.

19. The vehicle simulator according to claim 18, wherein:
  the anchorage consists of an actuator roller, on which the two opposite ends of the flexible thread-like element are constrained;
  the actuator roller is hinged to the mobile platform, so as to rotate relative to the mobile platform around the rotation axis; and
  the actuator roller is part of a secondary moving system, which is interposed between the mobile platform and the pilot's cabin and is suited to generate a relative movement between the mobile platform and the pilot's cabin.

20. The vehicle simulator according to claim 19, wherein further secondary moving system comprises a rotary support, which supports the pilot's cabin, is hinged to the mobile platform, so as to rotate relative to the mobile platform itself around the rotation axis, and is angularly integral to the actuator roller.

21. The vehicle simulator according to claim 1, wherein the moving system comprises two actuator devices, each comprising, in turn:
  a single flexible thread-like element, which is closed on itself in a ring shape; and
  a motorized mechanism comprising: two first pulleys, each mounted on the mobile platform so as to be an idler pulley and having the flexible thread-like element wound around it by 180°; two slides, which slide along respective straight guides and each support two second pulleys, which are mounted as idler pulleys and around which a corresponding side of the flexible thread-like element is wound by 90°, so that that the two sides of the flexible thread-like element are deflected in opposite directions; and four third pulleys, each interposed between two slides and having the flexible thread-like element wound around it by 90°.

22. The vehicle simulator according to claim 1, wherein:
the mobile platform is provided with at least two first pulleys, around which at least one flexible thread-like element is wound; and
a secondary moving system is provided, which is interposed between the mobile platform and the pilot's cabin and is suited to generate a relative movement between the mobile platform and the pilot's cabin using the rotary movement of the first pulleys.

23. The vehicle simulator according to claim 22, wherein the further secondary moving system comprises a differential mechanism, which, on one side, supports the pilot's cabin and, on the other side, is mechanically coupled to two first pulleys so as to receive a rotary motion from the two first pulleys: when the rotation speeds of the two first pulleys are identical, the pilot's cabin remains still relative to the mobile platform, whereas, when the rotation speeds of the two first pulleys are different, the pilot's cabin consequently rotates relative to the mobile platform.

24. The vehicle simulator according to claim 1, wherein the actuator device comprises at least one mechanical puller, which pre-pulls the corresponding flexible thread-like element regardless of the action of the motorized mechanism.

25. The vehicle simulator according to claim 1, wherein the motorized mechanism comprises:
at least one main electric motor which is suited to apply a pulling force to the flexible thread-like element, so as to always keep the flexible thread-like element in tension and, when needed, pull the mobile platform towards an edge of the fixed base;
at least one idler pulley around which the flexible thread-like element is wound; and
at least one damping electric motor coupled to an idler pulley to apply a controlled torque to damp out and reduce the effect of any disturbances imparted by external forces.

26. The vehicle simulator according to claim 1 and comprising at least one damping devices that can damp out any unwanted transverse resonances in the flexible thread-like elements.

* * * * *